US011151594B1

(12) United States Patent
Moran et al.

(10) Patent No.: US 11,151,594 B1
(45) Date of Patent: Oct. 19, 2021

(54) METHOD AND SYSTEM FOR REBATE DETERMINATION AND GENERATION

(71) Applicant: REBATEPROS, LLC, Corona del Mar, CA (US)

(72) Inventors: Jeffery Moran, Corona del Mar, CA (US); Jeremy Spriggs, Lake Forest, CA (US); Scott Hearty, Irvine, CA (US)

(73) Assignee: REBATEPROS, LLC, Corona del Mar, CA (US)

( * ) Notice: Subject to any disclaimer, the term of this patent is extended or adjusted under 35 U.S.C. 154(b) by 492 days.

(21) Appl. No.: 15/253,614

(22) Filed: Aug. 31, 2016

Related U.S. Application Data

(60) Provisional application No. 62/360,777, filed on Jul. 11, 2016.

(51) Int. Cl.
  *G06Q 30/02* (2012.01)
  *G06Q 10/06* (2012.01)
  *G06Q 30/06* (2012.01)

(52) U.S. Cl.
  CPC ... *G06Q 30/0234* (2013.01); *G06Q 10/06313* (2013.01); *G06Q 30/0611* (2013.01); *G06Q 30/0621* (2013.01)

(58) Field of Classification Search
  CPC ......... G06Q 30/0234; G06Q 10/06313; G06Q 30/0611; G06Q 30/0621
  USPC ...................................................... 705/7.23
  See application file for complete search history.

(56) References Cited

U.S. PATENT DOCUMENTS

| | | | | |
|---|---|---|---|---|
| 7,660,734 B1 * | 2/2010 | Neal | ...................... | G06Q 10/06 705/7.29 |
| 7,844,499 B2 * | 11/2010 | Yahiro | .................... | G06Q 10/10 705/26.41 |
| RE45,006 E * | 7/2014 | Deaton | .................. | G06Q 20/20 705/14.38 |
| 9,031,859 B2 * | 5/2015 | Salmon | .................. | G06Q 20/04 705/14.1 |

(Continued)

FOREIGN PATENT DOCUMENTS

WO WO-2006121541 A1 * 11/2006 ............. G06Q 30/02

OTHER PUBLICATIONS

The principal of the rebate to Wen, May 10, 2011 (Year: 2011).*
HomeSphere Inc. "All Track Quick Reference Guide" dated Oct. 15, 2006.

*Primary Examiner* — Charles Guiliano
*Assistant Examiner* — Po Han Lee
(74) *Attorney, Agent, or Firm* — Rutan & Tucker, LLP

(57) ABSTRACT

A method comprising receiving rebate offer information, receiving information of a project plan of a first project, wherein the project plan includes a listing of all floor plans in the first project, receiving a selection of standard installed products for each floor plan in the first project, automatically generating a standard installed products layer based on at least the information contained in the project plan and the selection of standard installed products for each floor plan, wherein the standard installed products layer sets forth each product of the one or more products included in each floor plan in the first project and a corresponding quantity for each of the one or more products, and automatically determining whether the criteria of the first rebate is satisfied based on at least the rebate offer, the standard installed products layer and the project plan is shown.

28 Claims, 16 Drawing Sheets

(56) References Cited

U.S. PATENT DOCUMENTS

| | | | | |
|---|---|---|---|---|
| 10,121,112 B1* | 11/2018 | Vasquez, Jr. | ....... | G06Q 30/0234 |
| 2001/0047299 A1* | 11/2001 | Brewer | ................ | G06Q 30/02 |
| | | | | 705/14.13 |
| 2002/0099617 A1* | 7/2002 | Fogelson | ............... | G06Q 30/02 |
| | | | | 705/14.39 |
| 2004/0267676 A1* | 12/2004 | Feng | ................ | G06Q 30/0283 |
| | | | | 705/400 |
| 2005/0209921 A1* | 9/2005 | Roberts | ................ | G06Q 30/02 |
| | | | | 705/14.13 |
| 2005/0278218 A1* | 12/2005 | Adams | ................ | G06Q 30/02 |
| | | | | 705/14.53 |
| 2006/0129456 A1* | 6/2006 | Walker | ............... | G06Q 30/0238 |
| | | | | 705/14.38 |
| 2006/0265281 A1* | 11/2006 | Sprovieri | ............... | G06Q 30/02 |
| | | | | 705/14.26 |
| 2008/0103942 A1* | 5/2008 | Shernaman | .......... | G06Q 10/087 |
| | | | | 705/28 |
| 2010/0106580 A1* | 4/2010 | Etheredge | .............. | G06Q 30/02 |
| | | | | 705/14.17 |
| 2010/0185547 A1* | 7/2010 | Scholar | .................. | G06Q 10/06 |
| | | | | 705/80 |
| 2010/0257047 A1* | 10/2010 | Foodman | ................ | G06Q 10/10 |
| | | | | 705/14.26 |
| 2011/0302063 A1* | 12/2011 | Bey | ........................ | G06Q 10/20 |
| | | | | 705/30 |
| 2012/0316935 A1* | 12/2012 | Feuerstin | ............... | G06Q 30/02 |
| | | | | 705/14.13 |
| 2013/0110599 A1* | 5/2013 | Gonzales | ........... | G06Q 30/0238 |
| | | | | 705/14.16 |
| 2013/0117094 A1* | 5/2013 | Jones | .................. | G06Q 30/0222 |
| | | | | 705/14.35 |
| 2014/0025343 A1* | 1/2014 | Gregg | ................. | G06F 17/5004 |
| | | | | 703/1 |
| 2016/0098802 A1* | 4/2016 | Bruffey | .................. | G06Q 40/08 |
| | | | | 705/4 |
| 2017/0169459 A1* | 6/2017 | Bruffey | ............. | G06Q 30/0234 |

* cited by examiner

FIG. 8

REBATEPROS

Dashboard    Units    Rebates    Invoices    Reports    Account Details

Rebate

801

Manufacturer:
[Carrier Corporation ▼]

Billing:
Billing Team
123 Example Street
Example Town, CA 92625
800-555-1234
example@example.com Primary Contact:
John Doe
*Does not receive billing notifications*

CC Emails to:
Not specified

802

Rebate Type:
◉ Cash   ○ Spend

Billing Cycle:
○ Monthly   ○ Quarterly   ○ Semi-Annually   ○ Annually
○ Transaction Fee Paid by Manufacturer [?]

Start Date:
[1/1/2015] 🗓
☑ Auto Renews

Payment Terms:
[Net 30 ⇅] [Edit]

Submittal Requirements:
☐ Trade Contractor
☐ Proof of Purchase
☐ Home Completions Forecast
☐ Model Number
☐ Serial Number Rebate Agreement:
Choose File   no file selected

803

General Notes:
[          ]

Price Protection:
[12 Months from Start Date]

Model Home Program:
[100% Discount on Model Product]

Design Centers:
[ex. Free samples]

Marketing Allowance:
[ex. Free mareting materials, training and displays]

Other Incentives:
[          ]

FIG. 10

REBATEPROS

Dashboard   Units   Rebates   Invoices   Reports   Account Details

Add Product

Product Name: [____]

Category: [Select Category ▼] Edit   Sub Category (Optional): [None ▼] Edit   Product Group (Optional): [None ▼] Edit

— 1001

Incentives [?]

Product Name: [Per House Sqft Tiered ▼]

Data Entry Instructions: [ex. Enter total number of units installed of product] [?]

Amount: [$____]  Start Qty: [____]  End Qty: [____]

Available To: [All Home Types ▼]  [Specific Division ▼]  [Select Division ▼]

— 1002

Exclusivity
- ✓ Non-Exclusive
- National Exclusive
- Regional Exclusive
- Divisional Exclusive
- Project Exclusive

[Add]

[Save]  [Close]

FIG. 12

REBATEPROS

Dashboard  Units  Rebates  Invoices  Reports  Account Details

Units

Division: | Project: | Status:
All Divisions | All Projects | All Homes

☐ Models Only  ☐ Customized Only      Search

| Lot | Address | Project | Sqft | Model | Completed | Rebates | |
|---|---|---|---|---|---|---|---|
| 1 | 1 Sample Street | Courtside Terrace | 1834 | Yes | 3/31/2015 | $697.00 | ∂ view |
| 10 | 10 Sample Street | Courtside Terrace | 1834 | | 3/31/2015 | $902.00 | ∂ view |
| 100 | 100 Sample Street | Courtside Terrace | 1834 | | 6/30/2015 | $902.00 | ∂ view |
| 101 | 101 Sample Street | Courtside Terrace | 1922 | | 6/30/2015 | $1,207.00 | ∂ view |
| 102 | 102 Sample Street | Courtside Terrace | 2101 | | 6/30/2015 | $1,649.50 | ∂ view |
| 103 | 103 Sample Street | Courtside Terrace | 1833 | | 6/30/2015 | $902.00 | ∂ view |
| 104 | 104 Sample Street | Courtside Terrace | 1922 | | 6/30/2015 | $1,207.00 | ∂ view |
| 105 | 105 Sample Street | Courtside Terrace | 2101 | | 9/30/2015 | $1,649.50 | ∂ view |
| 106 | 106 Sample Street | Courtside Terrace | 1833 | | 9/30/2015 | $902.00 | ∂ view |
| 107 | 107 Sample Street | Courtside Terrace | 1922 | | 9/30/2015 | $1,207.00 | ∂ view |

REBATEPROS

Dashboard   Units   Rebates   Invoices   Reports   Account Details

Sent Invoices

Manufacturer: [All Manufacturers ▼]   Year: [2016 ▼]   Quarter: [1 ▼]   Status: [All Statuses ▼]   Invoice #: [_____]

[Mark All as Paid]  [Export]

| Invoice # | Manufacturer | Type | Date | Period | Aging | Status | Total | Action |
|---|---|---|---|---|---|---|---|---|
| 2852 | Boise Cascade | Cash Back | 6/01/2016 | Q1 2016 | | Unpaid | $114,180.00 | Action ▷ |
| 2853 | Boral Roofing | Cash Back | 6/01/2016 | Q1 2016 | | Paid | $22,191.00 | Action ▷ |
| 2854 | Carrier Corporation | Cash Back | 6/01/2016 | Q1 2016 | | Paid | $108,075.00 | Action ▷ |
| 2855 | Delta Faucet | Cash Back | 6/01/2016 | Q1 2016 | | Paid | $131,600.00 | Action ▷ |
| 2856 | Eagle Roof Tile | Cash Back | 6/01/2016 | Q1 2016 | | Unpaid | $49,490.00 | Action ▷ |
| 2857 | Eldorado Stone | Cash Back | 6/01/2016 | Q1 2016 | | Paid | $108,755.05 | Action ▷ |
| 2858 | In-Sink-Erator | Cash Back | 6/01/2016 | Q1 2016 | | Unpaid | $5,880.00 | Action ▷ |
| 2859 | Kohler Company | Cash Back | 6/01/2016 | Q1 2016 | | Unpaid | $29,750.00 | Action ▷ |
| 2860 | Owens Corning | Cash Back | 6/01/2016 | Q1 2016 | | Paid | $25,830.00 | Action ▷ |
| 2861 | Rheem Manufacturing Company | Cash Back | 6/01/2016 | Q1 2016 | | Paid | $7,000.00 | Action ▷ |

METHOD AND SYSTEM FOR REBATE DETERMINATION AND GENERATION

CROSS-REFERENCE TO RELATED APPLICATIONS

This application claims the benefit of priority on U.S. Provisional Application No. 62/360,777, filed Jul. 11, 2016, the entire contents of which are incorporated by reference herein.

FIELD

Embodiments of the disclosure relate to the field of automated rebate determination. More specifically, embodiments of the disclosure relate to a system for receiving rebate offer and construction information, automatically processing the receiving information to create a customizable products table, and based at least on the received information and the customizable products table, automatically determining the criteria for one or more rebates has been satisfied.

GENERAL BACKGROUND

Currently, developers in the construction industry may interact with manufacturers to negotiate contracts, rebates and incentives for installing one or more products manufactured by a particular manufacturer. Typically, a developer is responsible for maintaining an inventory of every product installed in all units constructed by the developer and notifying the manufacturer in order to receive a rebate or incentive associated with the installed products. This is a time-consuming and onerous task, and thus, failure to keep an accurate inventory of all products installed within each constructed unit is commonplace. In addition, developers may be either unaware of universal rebates offered by one or more manufacturers or unable to recognize the inventory of installed products qualifies for one or more rebates. As a result, developers often fail to claim rebates for which they are eligible to receive. These scenarios result in developers receiving a lesser total rebate sum or fewer total incentives than could have otherwise been received with an accurate inventory of products installed.

Herein, the term "developer" may refer to an individual or company that oversees the development and/or construction of residential or commercial properties such as, inter alia, a housing community that includes one or more residential units that may include attached and/or detached houses or condominiums, a shopping center or commercial building that includes one or more commercial units, etc. Additionally, a developer may hire and oversee third-parties (e.g., independent contractors) to perform tasks during the development and/or construction process. The term "developer" may be used interchangeably with "builder."

One solution currently available to a developer enables a developer to provide a software program with a project plan and rebate contracts to aid in determining which rebates the developer is eligible for. However, such a software program has numerous flaws that fail to address the reality of the construction industry.

First, a project plan may include numerous residential or commercial units that adhere to a standard list of products ("a default unit") as well as numerous customized units. The current software program fails to easily enable customization of a single unit and customization of a plurality of layouts, e.g., floor plans, within a project plan automatically based on received input. Thus, the current software program may fail to accurately account for the numerous residential or commercial units that have been customized by individual buyers such that the customization requires a deviation from the standard list of products. Therefore, an inaccurate inventory of installed products may once again be used by developers to determine rebates for which a developer is eligible. Second, the standard products for one or more floor plans across one or more locations (e.g., a particular project plan, a particular region encompassing multiple project plans, etc.) may change at any time. As the standard products change, it is necessary for a developer to update the list of standard products such that an accurate inventory of installed products is used to determine for which rebates a developer is eligible. Additionally, current software programs do not provide a manner for facilitating the generation of rebate proposals.

BRIEF DESCRIPTION OF THE DRAWINGS

Embodiments of the invention are illustrated by way of example and not by way of limitation in the figures of the accompanying drawings, in which like references indicate similar elements and in which:

FIG. 8 is an exemplary embodiment of a fifth user interface display screen 800 produced by the dashboard generation logic of FIGS. 1 and 4 that provides an interactive dashboard.

FIG. 10 is an exemplary embodiment of a seventh user interface display screen 1000 produced by the dashboard generation logic of FIGS. 1 and 4 that provides an interactive dashboard.

FIG. 12 is an exemplary embodiment of a ninth user interface display screen 1200 produced by the dashboard generation logic of FIGS. 1 and 4 that provides an interactive dashboard.

FIG. 13 is an exemplary embodiment of a tenth user interface display screen 1300 produced by the dashboard generation logic of FIGS. 1 and 4 that provides an interactive dashboard.

DETAILED DESCRIPTION

Figure 1:
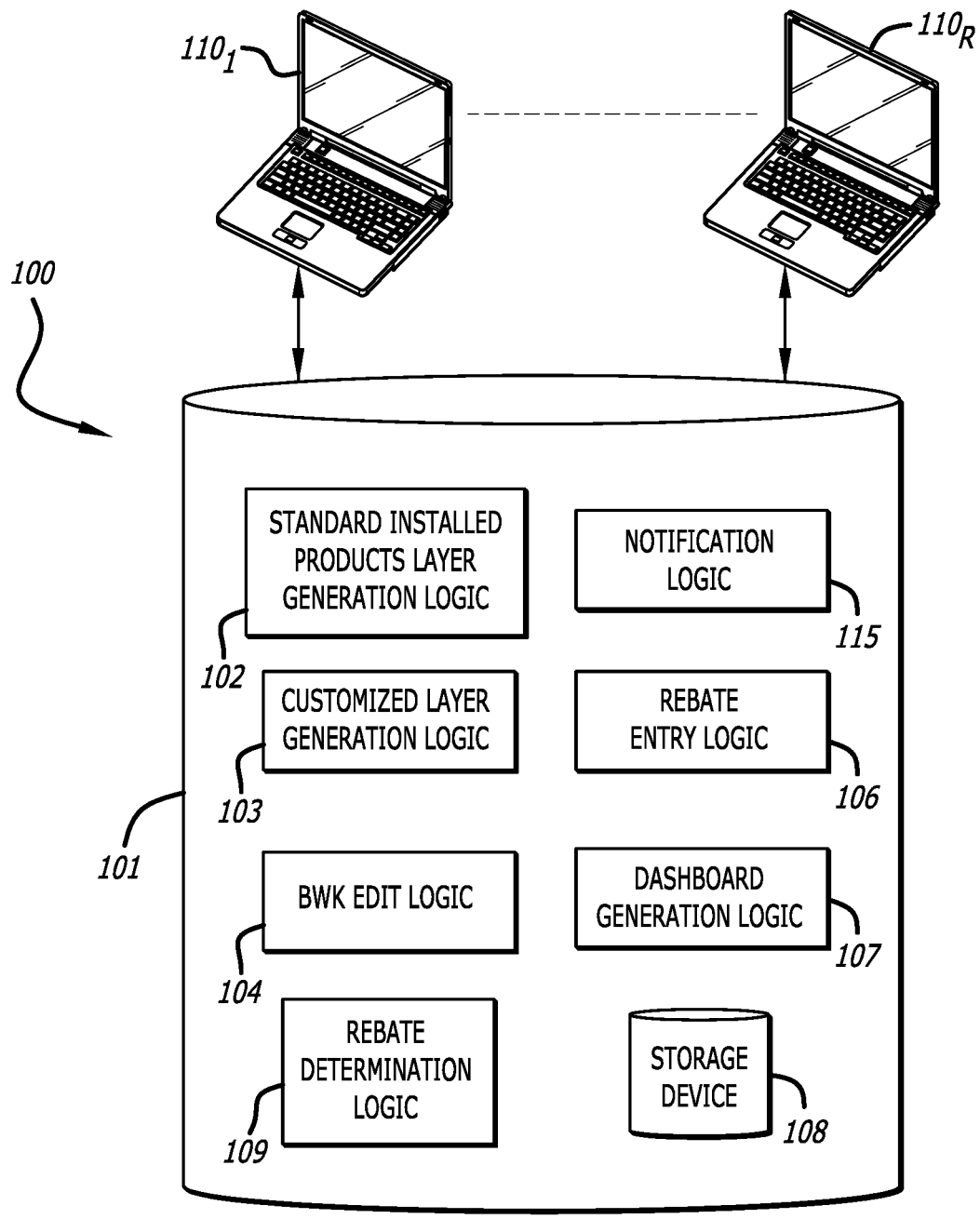
FIG. 1 is an exemplary block diagram of rebate determination system 101 connected to a plurality of client devices over network 100.

Various embodiments of the disclosure relate to a rebate determination system that improves the functionality of a computer by enabling a computer to generate a multi-layered customizable table and subsequently analyze the multi-layered customizable table to determine whether one or more predetermined rebate criteria have been satisfied based on the information included within the multi-layered customizable table.

A rebate may be a discount in price of a product, a free product, cash back, a future reduction in price, etc. A developer will be eligible for a rebate when products installed in one or more residential or commercial units constructed by the developer (hereinafter "units") satisfy criteria of a rebate offer. The criteria of a rebate offer may include requirements to install any combination of one or more products by one or more manufacturers in one or more units. Additional criteria may set forth, for example, but should not limited or restricted to, a monetary amount spent by the developer on one or more products, a particular quantity of one or more products installed in one or more units having a predetermined square footage, a particular percentage of a product category consisting of one or more products, exclusivity requirements, etc. Herein, the terms "rebate" and "incentive" will be used interchangeably.

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to hardware processors (e.g., a microprocessor or one or more processor cores), a programmable gate array, a microcontroller, a controller, an application specific integrated circuit, wireless receiver, transmitter and/or transceiver circuitry, semiconductor memory, or combinatorial logic.

Logic may also be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory (computer-readable) storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

I. Rebate Determination Platform

Referring to FIG. 1, an exemplary block diagram of rebate determination system 101 connected to a plurality of client devices over network 100 is shown. In one embodiment, one or more client devices $110_1$-$110_R$ (wherein R≥1) may be communicatively coupled to the rebate determination system 101 via network 100. The network 100 may include a public network such as the internet, a private network (e.g., a local area network "LAN", wireless LAN, etc.), or a combination thereof. A communication interface, not shown, within the rebate determination system 101 may serve to receive one or more objects transmitted via a wireless medium (e.g., a Wireless Local Area Network (WLAN) utilizing the Institute of Electrical and Electronics Engineers (IEEE) 802.11 standard) and/or a wired medium.

The rebate determination system 101 may include a server and logic including (i) a standard installed products layer generation logic 102, (ii) a customized layer generation logic 103, (iii) a bulk edit logic 104, (iv) a notification logic 105, (v) a rebate entry logic 106, (vi) a dashboard generation logic 107, and (vii) a rebate determination logic 109. The server may also include a storage device 108, which as described above, may include one or more types of a non-transitory storage medium. The standard installed products layer generation logic 102 includes functionality for receiving information such as one or more project plans and the standard installed products for each floor plan within the received project plans, and each elevation thereof, if applicable.

The term "project plan" may be interpreted to include details characterizing a particular development plan (e.g., a construction plan of residential or commercial properties such as a housing community, an apartment community, a condominium building, a commercial real estate complex, etc.), and enabling the project to be identified by the rebate determination system 101. Examples of information included within a project plan may include, but are not limited or restricted to, a project name, a project location, a project time frame, the number of each floor plan included in the project, and, optionally if known, the number of customized floor plans included in the project. Additionally, the term "unit" will be used to refer to a particular division within a project plan. For example, a unit with respect to a project plan describing a housing community would be in reference to a house. Alternatively, a unit with respect to a project plan describing an apartment community would be in reference to an apartment.

The term "floor plan" should be interpreted as information detailing a particular unit and may include, but is not limited or restricted to, the size of the floor plan (e.g., in square feet), the location of the floor plan, aesthetic qualities of the floor plan, etc. The term "elevation" may be interpreted as one or more minor variations to a floor plan. Specifically, a floor plan may include one or more elevations wherein each elevation includes a minor variation (e.g., an aesthetic variation, an additional characteristic included in one or more elevations of a floor plan such as a garage, etc.). Unless otherwise stated, the term "floor plan" as used hereinafter will include any possible elevations associated with the floor plan.

Figure 2:
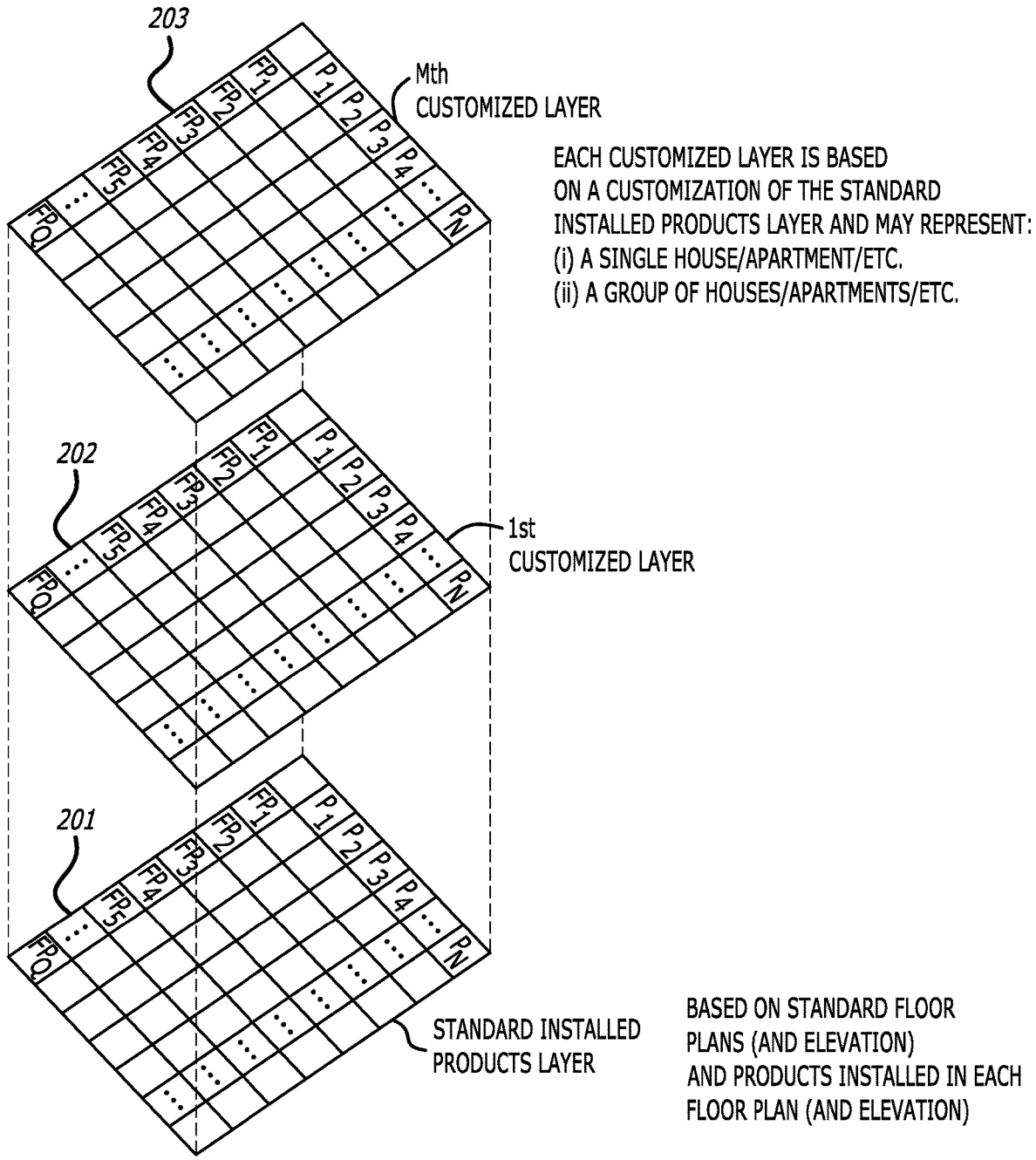
FIG. 2 is a flowchart of an exemplary process for rebate determination using the rebate determination system 101 of FIG. 1.

The standard installed products layer generation logic 102 generates a standard installed products layer, as seen in FIG. 2, by transforming the received data into a customizable table setting forth the quantity of each product with respect to each floor plan. The generated standard installed products layer will serve as a reference layer for at least the customized layer generation logic 103, the bulk edit logic 104, the notification logic 105, the rebate determination logic 109 and the dashboard generation logic 107. Additionally, the standard installed products layer will be associated with a current timestamp (e.g., timestamp 1). The timestamp will be used by the logic recited above to determine which version(s) of the standard installed products layer is to be used for analyses.

The bulk edit logic 104 includes functionality for receiving bulk edit information, which may include at least a depth of the bulk edit, a number of units affected by the bulk edit, the products whose quantity is to be altered and the altered quantity of each product. The bulk edit logic 104 generates a new, detached layer of the standard install products layer (e.g., a new, second version) and associates the new layer with a current timestamp (e.g., timestamp 2, wherein timestamp 2 occurs subsequent in time to timestamp 1). The second version of the standard installed products table is generated by creating a copy of the previous version of the standard installed products table and altering the quantity of one or more products. The second version of the standard installed products layer remains detached from the first version such that the next subsequent bulk edit will be based on the second version, and the first and second versions will remain unchanged. Continuing the example, the bulk edit logic 104 generates the second version of the standard installed products layer by altering one or more product quantities according to the specified depth. The term "depth" should be interpreted as meaning a designation of one or more floor plans such as, for example, all floor plans, regionally (e.g., restricted to floor plans of units in California, or floor plans of units in Northern California), by project plan, by elevation of one or more floor plans, etc.

The customized layer generation logic 103 includes functionality for receiving at least customization information, which may include one or more specified units and the products whose quantity is to be altered and the altered quantity of each product. The customized layer generation logic 103 generates a customized, detached layer of the current version of the standard installed products layer by copying the current version of the standard installed products layer and altering the quantity of the specified products of the one or more specified units. Thus, the customized layer generation logic 103 copies the most recent version of the standard installed products layer (e.g., having the latest-in-time timestamp) and adjusts the quantity of the one or more specified products. The customized layer remains completely detached from all other layers. Stated differently, by remaining completely detached, when used in subsequent determinations (e.g., rebate determinations), the rebate determination logic 109, for example, does not need to reference a version of the standard installed products layer when accounting for the customized layer.

The rebate determination logic 109 receives at least the rebate offer information, the current version of the standard installed products layer, each customized layer, and one or more project plans. In one embodiment, as will be discussed below, the rebate determination logic 109 may also receive selection information such that a determination of rebates for which criteria has been satisfied is restricted by the selection information (e.g., by a particular region or project, and/or a particular timeframe). In one embodiment, in which no selection information was received (e.g., a default scenario), the rebate determination logic 109 determines each rebate for which the criteria was satisfied based on an analysis of the rebate offer information, each generated version of the standard installed products layer and each customized layer, and the one or more project plans. The rebate determination logic 109 may then provide information associated with each rebate for which its criteria was satisfied and the corresponding manufacturer to the notification logic 105. The notification logic 105 includes functionality for automatically notifying one or more manufacturers of one or more rebates for which its criteria has been satisfied. For example, when the quantity of products used in a particular project satisfies the manufacturer's criteria (e.g., 500 units installed to purchased units within a calendar year), the notification logic 105 will receive data (e.g., rebate information, project name, name of developer overseeing project, name of product corresponding to rebate, etc.) from the rebate determination logic 109, and automatically generate and transmit a notification including at least a portion of the data to the corresponding manufacturer. The corresponding developer may also receive the notification. In one embodiment, the manufacturer's contact information may be stored in the storage device 108.

The dashboard generation logic 107 includes functionality for receiving input, for example via a graphical user interface (GUI) displayed by a client device, and communicating with one or more of the logic modules included within the rebate determination system 101 and generating a display, e.g., a GUI, that graphically illustrates, inter alia, an amount of money for which one or more developers qualify, which may be subsequently filtered by year, rebate, geographic region, project, product category, etc. The GUI generated by the dashboard generation logic 107 and through which input is received by the dashboard generation logic 107 may be referred to as a "dashboard." The dashboard generation logic 107 may continually receive input, provide the input to one or more logic modules, and automatically update the GUI based on the input. As will be discussed in detail below, in one example, the dashboard generation logic 107 may generate a dashboard, receive input via the dashboard and filter information displayed by the dashboard according to the received input.

The rebate entry logic 106 includes functionality for receiving input related to entering rebates. For example, the rebate entry logic 106 may receive the rebate offer information as discussed above. The rebate offer may be a list of one or more rebates entered by the developer, the manufacturer or other user that details the criteria needed to qualify for a particular rebate. Such criteria may include one or more products (e.g., a representation of a product name, a bar code, or other unique identifying characteristic). In an alternative embodiment, the rebate offer information may be entered manually (e.g., via the dashboard mentioned above). In one embodiment, the dashboard generation logic 107 and the rebate logic 106 are implemented as a single logic module.

Referring to FIG. 2, an illustration a plurality of layers generated by the rebate determination system 101 of FIG. 1 is shown. FIG. 2 provides an illustration of a standard installed products layer 201 (e.g., a first version), which is based on standard floor plans and the standard products installed in each standard floor plan. In one embodiment, the standard installed products layer sets forth the default products and corresponding quantities used in each floor plan. The standard installed products layer may be any organized format of the above-described information. As one example, illustrated in FIG. 2, the standard installed products layer may be represented as a table with each row representing a single floor plan and each column representing a single product. An intersecting box (e.g., $FP_1$ and $P_1$) represents the default quantity of a first product ("$P_1$") in a first floor plan (e.g., "$FP_1$").

FIG. 2 also provides an illustration of one or more customized layers $202_1$-$202_M$ (wherein M≥1). Each customized layer represents one or more units that have been customized (e.g., quantity of one or more installed products altered from the default). For example, a single unit may be customized to fit a buyer's needs. Thus, a customized layer according to the buyer's needs may represent the customization of a single unit. Alternatively, or in addition, a customized layer may represent a plurality of customized units, wherein each unit includes the same customization. In an example embodiment wherein a customized layer represents a plurality of customized units, the customized layer may represent a plurality of houses within a housing community (e.g., the housing community may represent the project plan) having the same customization. The remaining houses within the housing community may be either standard floor plans or separate customized units (which would result in one or more customized layers).

Still referring to FIG. 2, the first customized layer corresponds to a customized version of a first floor plan (referred to as "$FP_1$'") and the $M^{th}$ customized layer corresponds to a customized version of the second floor plan (referred to as "$FP_2$'").

II. Rebate Determination Methodology

Figure 3:
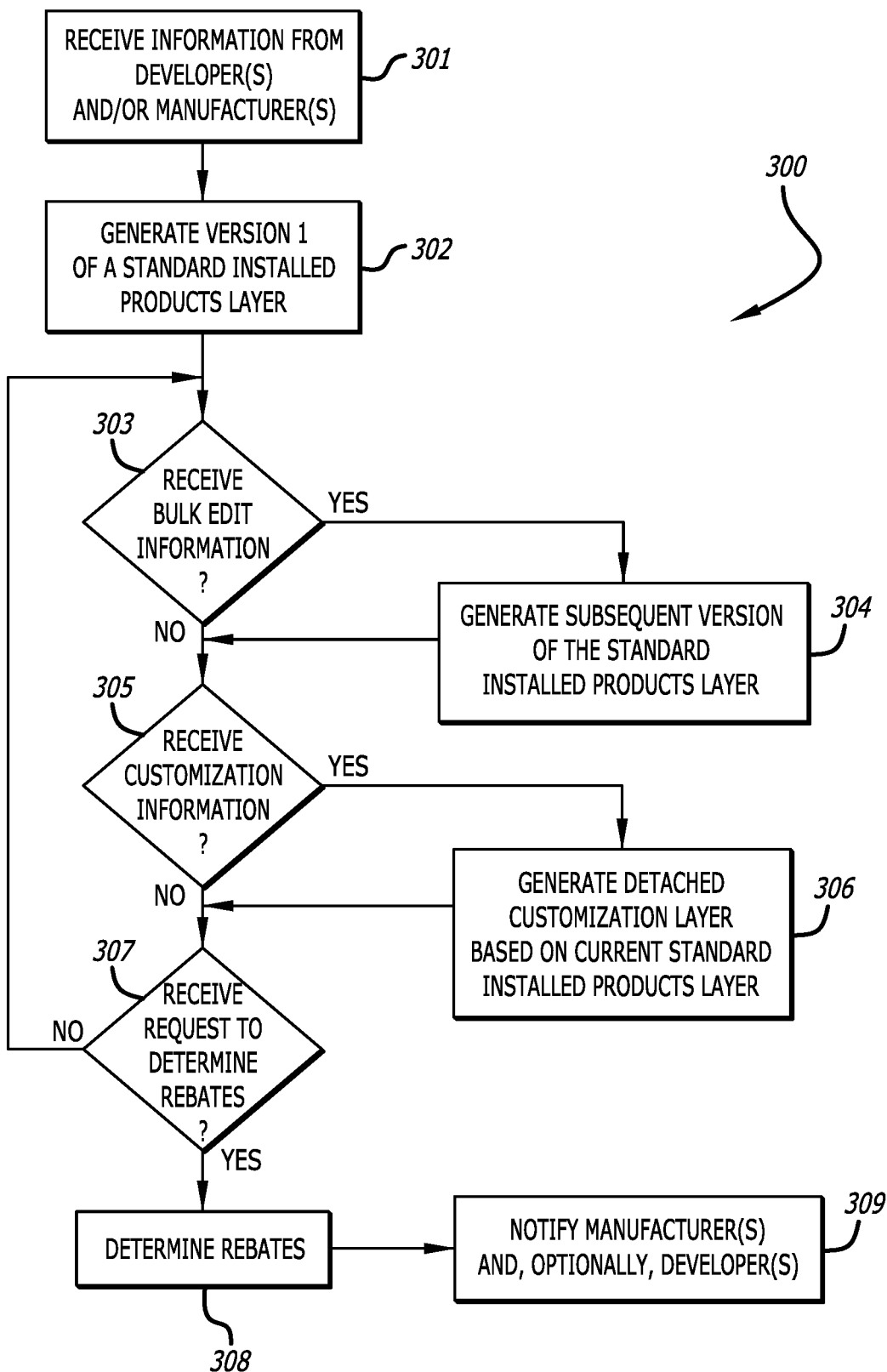
FIG. 3 is an illustration a plurality of layers that comprise a rendered product table.

Referring to FIG. 3, a flowchart illustrating an exemplary method of determining one or more rebates with the rebate determination system 101 of FIG. 1 is shown. Each block illustrated in FIG. 3 represents an operation performed in the method 300 of one process for determining rebates. Referring to FIG. 3, the rebate determination system receives information from one or more developers and/or one or more manufacturers (block 301). The received information includes at least one or more project plans, the standard installed products for each floor plan and the rebate information. As will be discussed in more detail below, a rebate may be (i) a "universal" rebate that applies to all developers, or (ii) a "developer-exclusive" rebate that applies to only a specific developer (e.g., negotiated separately between the developer and manufacturer). Herein, a developer-exclusive rebate may refer more broadly to a non-universal rebate. For example, a plurality of developers may the same developer-exclusive rebate established with a manufacturer, but the rebate is not a universal rebate that applies to any and all developers.

The rebate information may include additional information detailing which rebates are universal and which are developer-exclusive. As discussed above, a project plan may include information such as the number of units of each floor plan, a location at which the project will be developed, a name of the project, etc. Additionally, as discussed above, the information regarding the standard installed products may include a quantity of each product that is to be installed in each standard floor plan. In one embodiment, this information may also include the price of each product. The information may be received entirely by one or more developers and/or by one or more manufacturers.

At block 302, the rebate determination system generates version 1 of a standard installed products layer based on the received information based on the received information as described above. Version 1 of the standard installed products layer sets forth each floor plan and the quantity of each product installed therein included in the information received in block 301. Additionally, the information received in block 301 and included in each version of the standard installed products layer may include detailing of each project and the one or more corresponding floor plans, the location of each project (e.g., region, state, city, etc.), detailing of each elevation for one or more floor plans, etc. Hereinafter, this additional information may be referred to as "metadata of the standard installed products layer."

Subsequent to the generation of version 1 of the standard installed products layer, a determination is made by the rebate determination system as to whether bulk edit information has been received (block 303). As discussed above, bulk edit information may include, inter alia, at least a depth of the bulk edit, a number of units affected by the bulk edit, the products whose quantity is to be altered and the altered quantity of each product. When the rebate determination system has received bulk edit information (yes at block 303), the rebate determination system generates a subsequent version of the standard installed products layer (for example, version 2) (block 304). Importantly, only the latest version (also referred to herein as the "current version") is used by the rebate determination logic. As will be discussed below, the rebate determination logic analyzes the standard installed products layer according to one or more project plans and determines whether one or more rebate criteria are satisfied based on the product quantities set forth in the current standard installed products layer (in addition to one or more customized layers, if applicable). The method 300 then progresses to block 305. When the rebate determination system has not received bulk edit information (no at block 303), the method 300 then progresses to block 305.

At block 305, a determination is made by the rebate determination system as to whether customization information has been received. As discussed above, customization information may include, inter alia, one or more specified units and the products whose quantity is to be altered and the altered quantity of each product. When the rebate determination system has received customization information (yes at block 305), the rebate determination system generates a customized, detached layer (block 306). As discussed above, a customized, detached layer is generated by copying the current version of the standard installed products layer and altering the quantity of the specified products for one or more specified units. In one embodiment, the customization may apply to a single unit or alternatively, a plurality of units. Thus, the rebate determination logic copies the most recent version of the standard installed products layer (e.g., the most recent version) and adjusts the quantity of the one or more specified products. Importantly, the customized, detached layer remains completely detached from all other layers and; therefore, subsequent bulk edits will not impact the customized, detached layer. The method 300 then progresses to block 307. When the rebate determination system has not received customization information (no at block 305), the method 300 then progresses to block 307. Additionally, merely for illustrative purposes, the operations of receiving bulk edit information and generating a subsequent version of the standard installed products layer appear prior to the operations of receiving customization information and generating a customized, detached layer based on the current standard installed products layer. The illustration of FIG. 3 is not intended to be limiting in the scope of the order of operations such that it is contemplated that the rebate determination system may receive customization information and generate a customized, detached layer prior to receiving bulk edit information and generating a subsequent version (e.g., a version subsequent to version 1) of the standard installed products layer.

At block 307, a determination is made by the rebate determination system as to whether a request to determine applicable rebates has been received. When the rebate determination system has not received a request to determine rebates (no at block 307), the method 300 may return to block 303 to determine whether additional bulk edit information has been received. In one embodiment, while the rebate determination system waits to receive a request for a determination of applicable rebates, the rebate determination system may continue to generate new versions of the standard installed products layer when new bulk edit information is received and/or generate additional customized, detached layers when customization information is received.

When the rebate determination system has received a request to determine rebates (yes at block 307), the rebate determination system determines the applicable rebates (block 308). The rebate determination logic 109 of FIG. 1 determines rebates for which a developer is eligible by analyzing one or more project plans (specifically, only considering units within the project plan that qualify for consideration, as discussed below), the current standard installed products layer, one or more customized layers, and one or more rebate offers. More specifically, when the rebate determination logic begins operations to determine the rebates for which a developer qualifies (e.g., the products installed in the units constructed by the developer over a particular timeframe meet the criteria to qualify for a rebate set forth in a rebate offer), the rebate determination logic extracts the applicable rebates from storage in the rebate determination system (or stored externally, e.g., in non-transitory cloud storage or other non-transitory storage located remotely). Units qualify for consideration in the rebate determination process based on meeting at least one of a predetermined triggers, examples of which may include, but are not limited or restricted to: (i) a certificate of occupancy has been acquired for the unit, (ii) the unit has been purchased (e.g., escrow has closed on the unit), (iii) construction of the unit has been completed, (iv) or the like. As used herein, the use of the term "project plan" when used in discussing the rebate determination process refers to only those units within the project plan that qualify for consideration in the rebate determination process. Applicable rebates are those that are either exclusive to that developer or universal rebates not superseded by a developer-exclusive rebate. In one embodiment, the rebate determination logic may determine a universal rebate is superseded by a developer-exclusive rebate when the two rebates share a common product. Alternatively, or in addition, the rebate determination logic may, after determining the developer is not eligible for the developer-exclusive rebate, may determine whether the developer is eligible for the universal rebate (e.g., the criteria of a developer-exclusive rebate may be harder to meet due to a greater savings). In yet another alternative embodiment, or in addition to, when the rebate determination logic determines the developer is eligible for both a developer-exclusive rebate and a superseded universal rebate, the rebate determination logic may make a second determination as to which rebate provides the developer with the greater savings and applies that rebate. Subsequent to determining the applicable rebates, the rebate determination logic analyzes the applicable rebates in light of, at least, the current version of the standard installed products layer, one or more project plans and one or more customized layers, if applicable, to determine the quantity of each product installed and other information required by rebate criteria (e.g., square footage of a unit). The rebate determination logic then determines rebates for which criteria has been satisfied.

It should be noted that in a first embodiment, the units counted in project plans used in the rebate determination process are only those which have been sold (e.g., a buyer has completed purchase). Alternatively, the units counted may include all completed units that are still on the market. Also contemplated is an embodiment in which the rebate determination is performed for units that are planned but construction has not started or are not yet completed.

Following the determination of the rebates for which the developer qualifies, the rebate determination system notifies the manufacturers corresponding to the rebates and, optionally, one or more developers (block 309).

Figure 4:
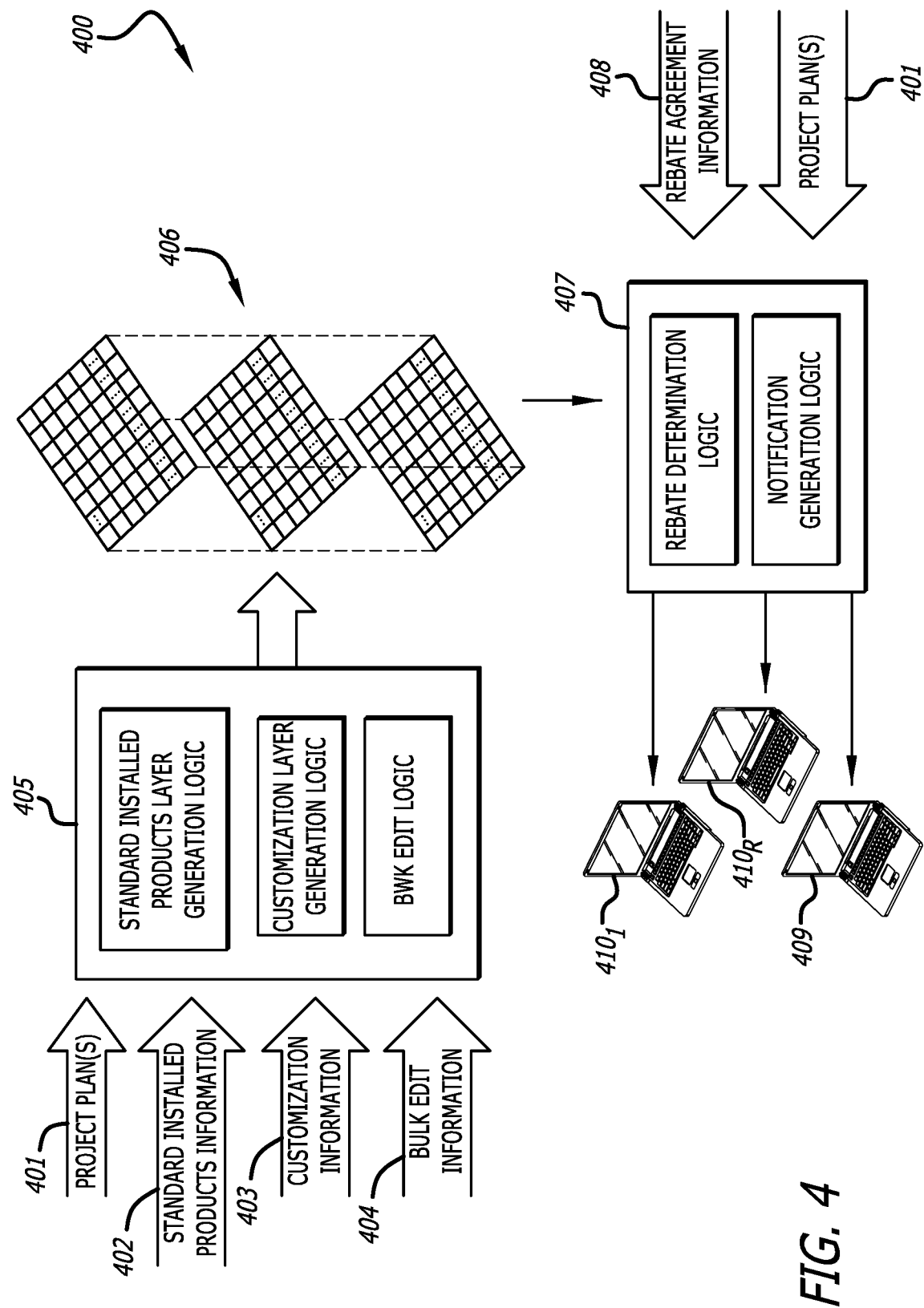
FIG. 4 is a flowchart of an exemplary process for rebate determination and dashboard generation using the rebate determination system 101 of FIG. 1.

Referring to FIG. 4, a flowchart of an exemplary process for rebate determination using the rebate determination system of FIG. 1 is shown. Each block illustrated in FIG. 4 represents an operation performed in the method 400 of a rebate determination technique. The process of FIG. 4 illustrates information being received logic modules (e.g., the standard installed products layer generation logic and the customization layer generation logic) in order to generate one or more layers of a product table (e.g., at least a first version of a standard installed products layer and, optionally, one or more customized layers). More specifically, the information received by the logic modules includes, at least, one or more project plans 401 and standard installed products information 402. The logic modules 405 may also receive customization information 403 and bulk edit information 404. The logic modules 405 that perform operations including generation of one or more standard installed products layers and, optionally, one or more customization layers includes the standard installed products layer generation logic, customization layer generation logic and bulk edit logic. As discussed above, the logic modules 405 perform operations that generate at least version 1 of a standard installed products layer and, optionally, one or more subsequent versions of the standard installed products layer and one or more customized layers (the layers referred to as numeral 406).

Upon generation of the one or more layers 406, the logic modules 407, including rebate determination logic and notification logic, determine whether criteria for one or more rebates has been satisfied, as detailed above. The rebate determination process is performed by the rebate determination logic and is based on at least an analysis of the layers 406 according to the project plans 401 and the rebate offer information 408. Subsequently, information regarding each rebate for which the corresponding criteria was satisfied is provided to the notification generation logic, which may automatically generate a notification for each rebate and transmit the notification to one or more manufacturers $410_1$-$410_R$ (wherein R≥1) and/or one or more developers 409.

III. Rebate Proposal Platform

Figure 14:
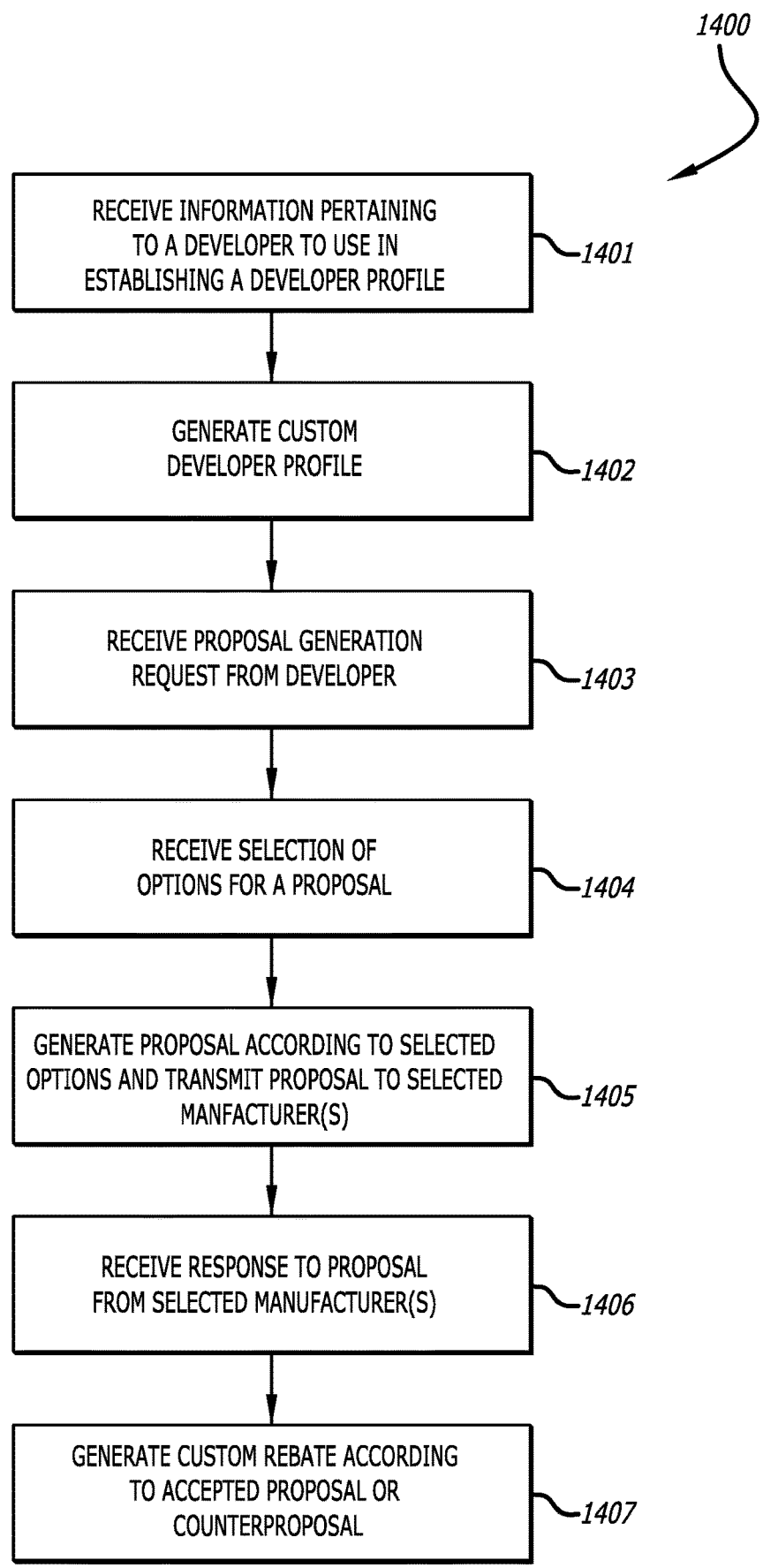
FIG. 14 is a flowchart of an exemplary process of the rebate proposal platform as performed by the rebate determination system 101 of FIG. 1.

Referring to FIG. 14, a flowchart of an exemplary process of the rebate proposal platform as performed by the rebate determination system 101 of FIG. 1 is shown. Each block illustrated in FIG. 14 represents an operation performed in the method 1400 of generating a proposal for a rebate and a developer-custom rebate as a result. As discussed herein, a proposal refers to a proposal to establish a developer-exclusive rebate. In a first embodiment, the proposal may include options selected by a developer, generated by the rebate determination system 101 and transmitted to a manufacturer. In a second embodiment, the manufacturer may select options for a proposal, the rebate determination system 101 may generate the proposal and transmit the proposal to one or more developers.

At block 1401, the rebate determination system 101 receives information pertaining to a developer to use in establishing a developer profile. Examples of information pertaining to a developer include, but are not limited or restricted to, a name, an address, a number of units built/developed by the developer, number of employees employed by the developer, etc. At block 1402, the rebate determination system 101 generates a custom developer profile based on the received developer information. Based on the developer information, the rebate determination system 101 generates a custom profile for the developer which sets forth information in a standardized format for review by one or more manufacturers. The developer profile is a custom profile having a standardized format among other developer profiles such that a manufacturer can quickly and easily access relevant developer information necessary to make a decision as to whether to accept a proposal from the developer, or provide a counterproposal.

At block 1403, the rebate determination system 101 receives a proposal generation request from the developer for which a developer profile has been created. The rebate determination system 101 may generate a GUI, as discussed below, which receives input from a user that may include a request to generate and transmit a proposal to one or more manufacturers. In one embodiment, the proposal may be transmitted to a single manufacturer regarding a rebate for one or more products sold by the manufacturer. In a second embodiment, the proposal may be transmitted to a plurality of manufacturers regarding rebates for one or more products either sold separately by each manufacturer (e.g., to determine which manufacturer will provide the most advantageous rebate to the developer for a product) and/or a combination of products sold by two or more manufacturers.

At block 1404, the rebate determination system 101 receives selection data including options for a proposal. In one embodiment, the rebate determination system 101 may generate a GUI for displaying a screen containing a plurality of options for inclusion within a rebate proposal. The rebate determination system 101 may receive input via the GUI from a developer, wherein the input includes a selection of one or more options for establishing a rebate (e.g., a time period for which the rebate would apply, one or more products, one or more criteria wherein the satisfaction thereof would be required for the developer to qualify for the rebate). In one embodiment, the proposals may be limited to products already included within the rebate determination system 101. Thus, for example, a developer may be able to select one or more products listed within the standard installed products layer to include within the proposal. In an alternative embodiment, the developer may include a product not included within the rebate determination system 101, wherein acceptance of the proposal by the manufacturer (or of a counterproposal including the product not already within the rebate determination system 101) may prompt the rebate determination system 101 to automatically add the product to the listing of products within the standard installed products layer.

At block 1405, the rebate determination system 101 automatically generates a proposal according to the received selection data and transmits the generated proposal to one or more selected manufacturers. Importantly, the generated proposal is set forth in a standard format among all proposals generated by the rebate determination system 101 and transmitted to manufacturers (or to developers, if designed by a manufacturer). The standardization of the proposal format simplifies the proposal-counterproposal process by providing each party with all necessary information in an easy to understand format that, when used by numerous developer and manufacturers, gains familiarity by all parties involved, thus further simplifying the proposal process. As one advantage over previous proposal processes, the standardized format makes understanding the one or more products and the criteria involved easy and standard for all developers and manufacturers. As a second advantage, the rebate proposal methodology as disclosed herein, utilizing the rebate determination system 101, facilitates an improved methodology over previous proposal processes in that a list of products maintained by the rebate determination system 101 is leveraged.

For example, a developer may know of a particular manufacturer that is in the business of selling, for example, water heaters but does not have all of the particularities to list one or more specific products of the manufacturer. Thus, without the particularities of a specific product, the proposal process is complex, and at times, frustrating for both parties as confusion may arise as to which products are involved in the proposal. However, leveraging the list of products maintained by the rebate determination system 101, a developer may search through list (e.g., via a GUI by manufacturer, product category, etc.) to select a specific product by a specific manufacturer.

Upon the selection of the specific product, the rebate determination system 101 will include the particularities of the selected product in the proposal, thus, removing any possibility of confusion between the developer and manufacturer as to which product is involved in the rebate proposal. For example, the particularities may include one or more of a product name, a product bar code, a product skew number, manufacturer-proprietary representation and/or some other representation that enables the manufacturer to easily identify the specific product. Additionally, selection of criteria from a predetermined list allows such to be easily understood by all parties as well. In one embodiment, the party submitting the proposal request may also write in criteria to be included in the proposal (e.g., via a textbox within a GUI of the rebate determination system 101).

Returning to block 1405, once selection information has been received by the rebate determination system 101, the rebate determination system 101 automatically generates and transmits the proposal to one or more manufacturers.

At block 1406, the rebate determination system 101 receives a response to the proposal from the one or more selected manufacturers. The embodiment in which a developer designs a proposal for a manufacturer will be discussed here for clarity purposes but, as discussed above, it has also been contemplated that the manufacturer may design a proposal for generation by the rebate determination system 101. In one embodiment, the manufacturer may agree to the proposal and accept, thus the rebate determination system 101 receives a notification of acceptance (the rebate determination system 101 may subsequently transmit a notification to the developer notifying the developer of acceptance). In a second embodiment, the manufacturer may provide a counterproposal (e.g., an alteration of the criteria, one or more products, the time period, the rebate (e.g., cashback, amount thereof, etc.), etc.), which is received by the rebate determination system 101 and transmitted to the developer. In yet another embodiment, the manufacturer may simply deny the proposal request. For example, within the standardized proposal format, a section (e.g., portion of the message, an icon, a tab, etc.) may include standardized reply options.

At block 1407, the rebate determination system 101 automatically generates a developer-exclusive rebate according to the proposal and/or the response to the proposal for the developer. In one embodiment, when the proposal is accepted (or a counterproposal accepted), the rebate determination system 101 may automatically convert the proposal/counterproposal to a developer-exclusive rebate and place the rebate in storage associated with the rebate determination system 101 such that upon a rebate determination process with respect to the developer, the developer-exclusive rebate will be extracted from storage and included within the process.

IV. Dashboard Generation Methodology

Figure 5:
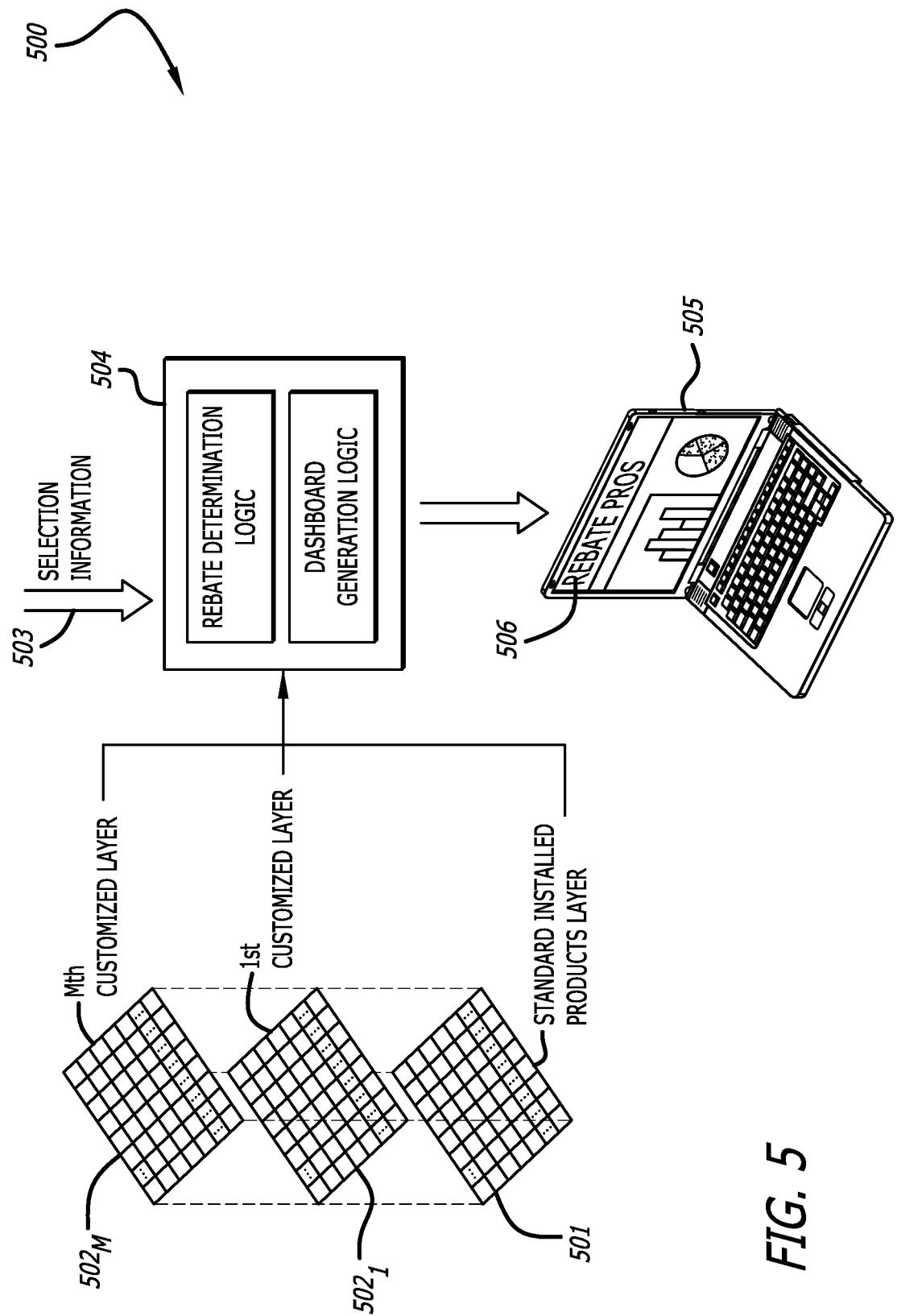
FIG. 5 is a timeline illustrating the process of generating a first version of a standard installed products layer, one or more customized layers, and generating a second version of the standard installed products based on one or more bulk edits using the rebate determination system 101 of FIG. 1.

Referring to FIG. 5, a flowchart of an exemplary process for rebate determination and dashboard generation using the rebate determination system 101 of FIG. 1 is shown. Each block illustrated in FIG. 5 represents an operation performed in the method 500 of one rebate determination technique. As discussed above, the rebate determination system may include dashboard generation logic that generates a dashboard (e.g., a GUI) that may be displayed on a client device (e.g., a laptop, tablet, smart phone, etc.). At least part of the dashboard may include information generated by the rebate determination logic of the rebate determination system 504, illustrated in part. As is shown, the latest version of the standard installed products layer 501, and if generated, the customized, detached layers $502_1$-$502_M$ may be provided to the rebate determination logic. The rebate determination logic may also receive selection information 503. In one embodiment, the selection information may include a request from a client device 505 requesting display of the dashboard.

Upon the rebate determination logic performing an analysis of the one or more layers 501 and $502_1$-$502_M$, selection information, the rebate offers and the project plans, the rebate determination logic may provide the dashboard generation logic with information such as an amount of money for which one or more developers qualify. The dashboard generation logic may generate one or more display screens comprising the dashboard presenting the generated information. The information presented by the dashboard may be subsequently filtered by one or more filters including, but not limited or restricted to, year, rebate, geographic region, project, product category, etc. Herein, the rebate offers and the project plans may have been previously provided to and stored by the rebate determination system 504. Additionally, the rebate determination system 504 may receive subsequent selection information (e.g., an adjustment of filters provided for narrowing or expanding the information displayed on the dashboard) and alter the dashboard based on the newly received selection information.

Figure 6:
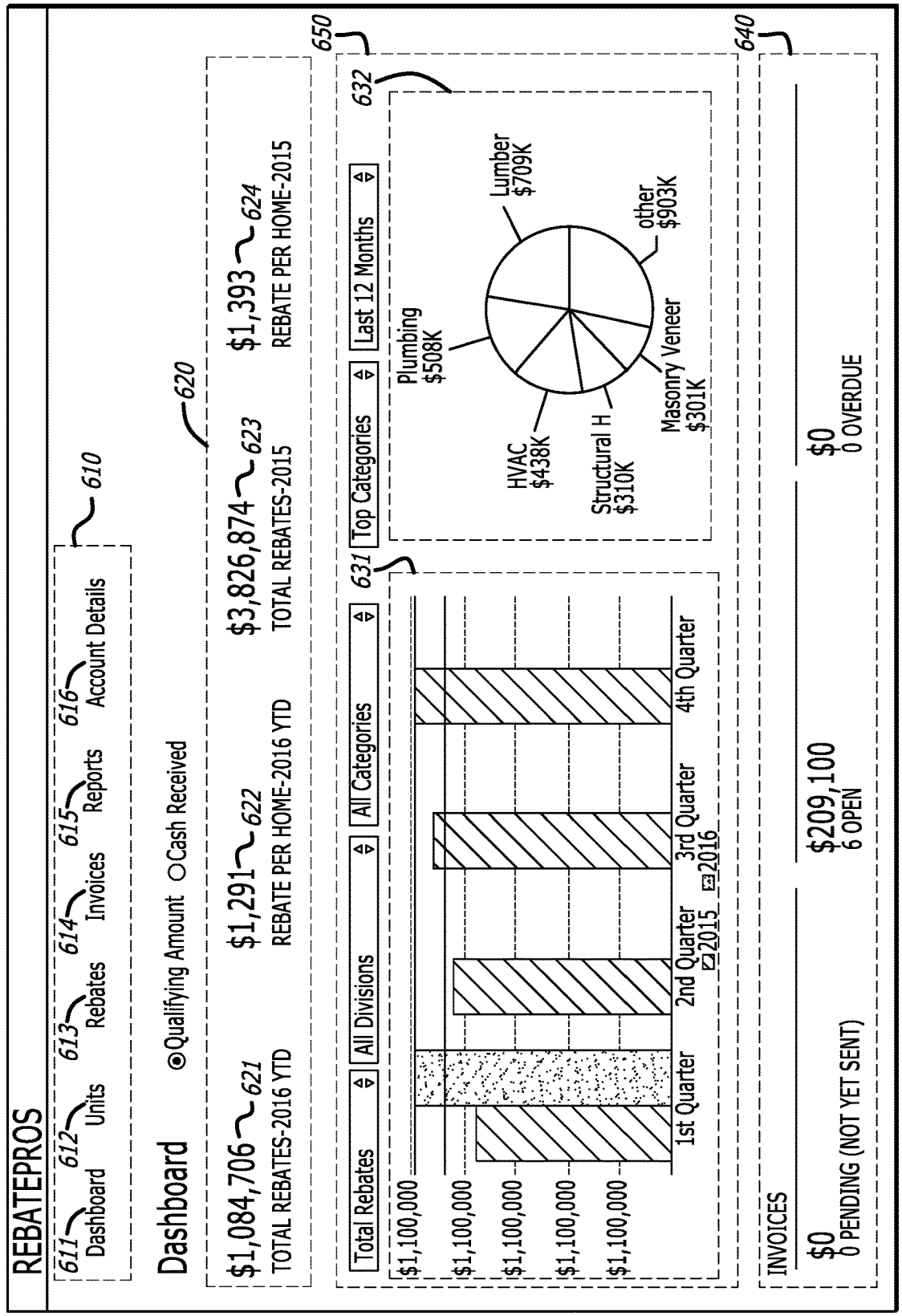
FIG. 6 is an exemplary embodiment of a first user interface display screen 600 produced by the dashboard generation logic of FIGS. 1 and 4 that provides an interactive dashboard.

Referring to FIG. 6, an exemplary embodiment of a first user interface display screen 600 produced by the dashboard generation logic of FIGS. 1 and 4 that provides an interactive dashboard is shown. Herein, rendered by the dashboard generation logic, the display screen 600 comprises a plurality of display areas 610, 620, 630 and 640 that illustrates information directed to a default screen (or alternatively referred to as a "home screen") of the rebate determination system dashboard ("the dashboard"). More specifically, according to one embodiment of the disclosure, a first area 610 displays a plurality of options 611-616 that enables a user to select filters that determine what information is displayed by the dashboard. Each option will be discussed in greater detail below. Additional embodiments have been contemplated such that the display areas illustrated herein may appear in alternative forms. For example, the plurality of display options 611-616 may include more or fewer display options. In one alternative embodiment, the display area 610 may include additional display options dedicated to Installed Products (e.g., representing a dropdown menu to select a link to one of a standard installed products webpage or a bulk edit webpage) and/or Trade Contractors (e.g., representing a dropdown menu to select a link to a webpage listing one or more trade contractors registered with the rebate determination system).

The display area 620 includes a plurality of monetary sums displaying statistics for rebates for one or more timeframes. As shown, the following rebates may be displayed: total rebates for a first year (display area 621), average rebates per home for a first year (display area 622), total rebates for a second year (display area 623) and average rebates per home for a second year (display area 624).

Additionally, display area 630 includes a plurality of graphical displays that illustrates various rebate statistics (e.g., bar graph 631 and pie chart 632). However, other graphical displays have been contemplated and the disclosure should be not limited to bar graphs and pie charts. Display area 640 is seen to illustrate a plurality of statistics regarding invoices (e.g., pending, open and overdue).

Figure 7A:
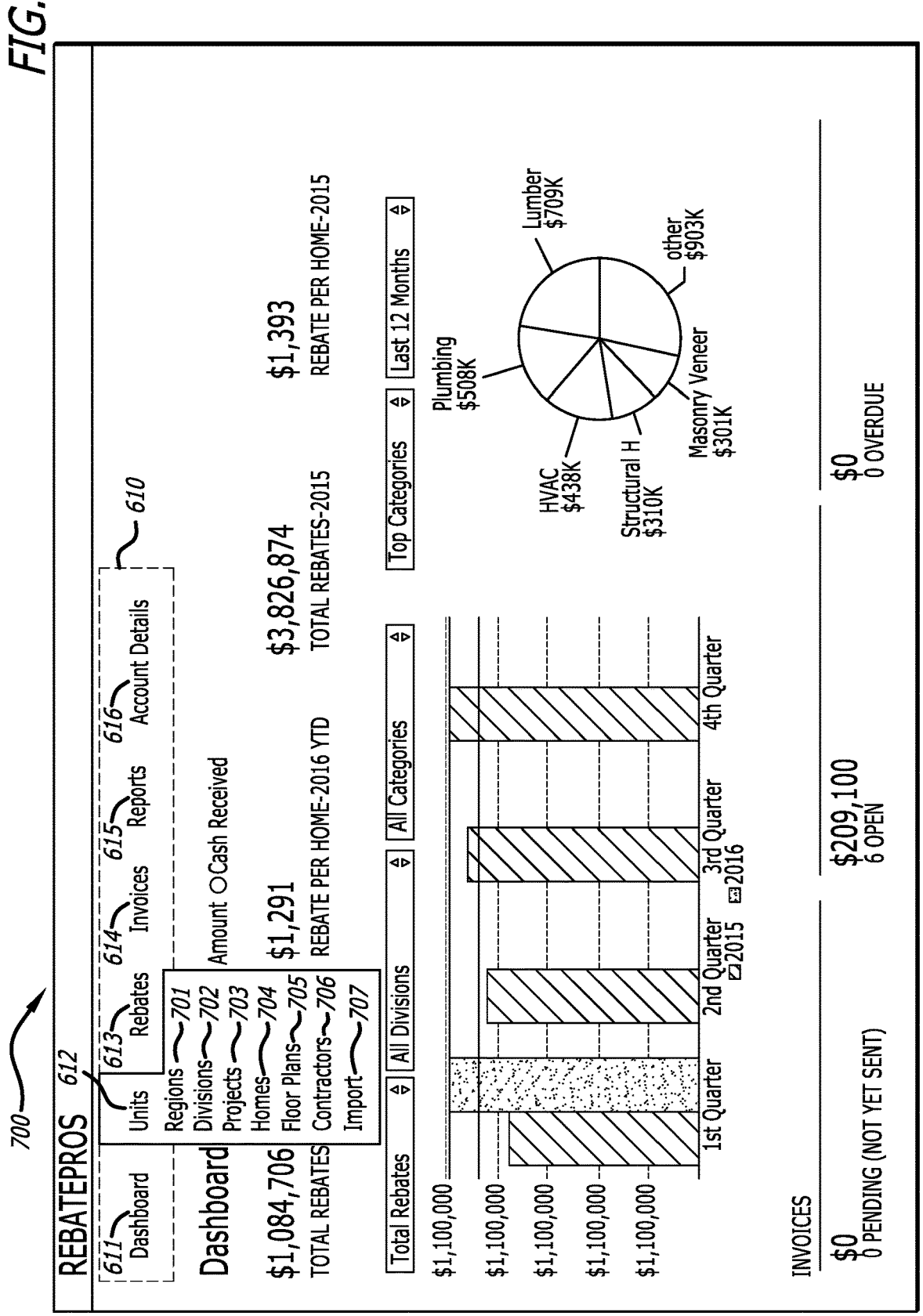
FIG. 7A is exemplary embodiment of a second user interface display screen 700 produced by the dashboard generation logic of FIGS. 1 and 4 that provides an interactive dashboard.

Referring to FIG. 7A, an exemplary embodiment of a second user interface display screen 700 produced by the dashboard generation logic of FIGS. 1 and 4 that provides an interactive dashboard is shown. Herein, rendered by the dashboard generation logic, the display screen 700 comprises a plurality of display areas as discussed above and specifically display area 610, which illustrates option Units 612 selected and presents a further drop-down menu including additional options for filtering the information displayed by the dashboard display screen. The drop-down menu options include, but are not limited or restricted to, Regions 701, Divisions 702, Projects 703, Homes 704, Floor Plans 705, Contractors 706 and Import 707. The additional filtering options presented when the option Units 612 is selected filter the information displayed on the dashboard to rebate information related to a subset of all units constructed. As one example, when Regions 701 is selected, the user may select one or more of a plurality of regions (e.g., Southern California), which will filter the information displayed on the dashboard to rebates only with respect to the selected one or more regions.

Figure 7B:
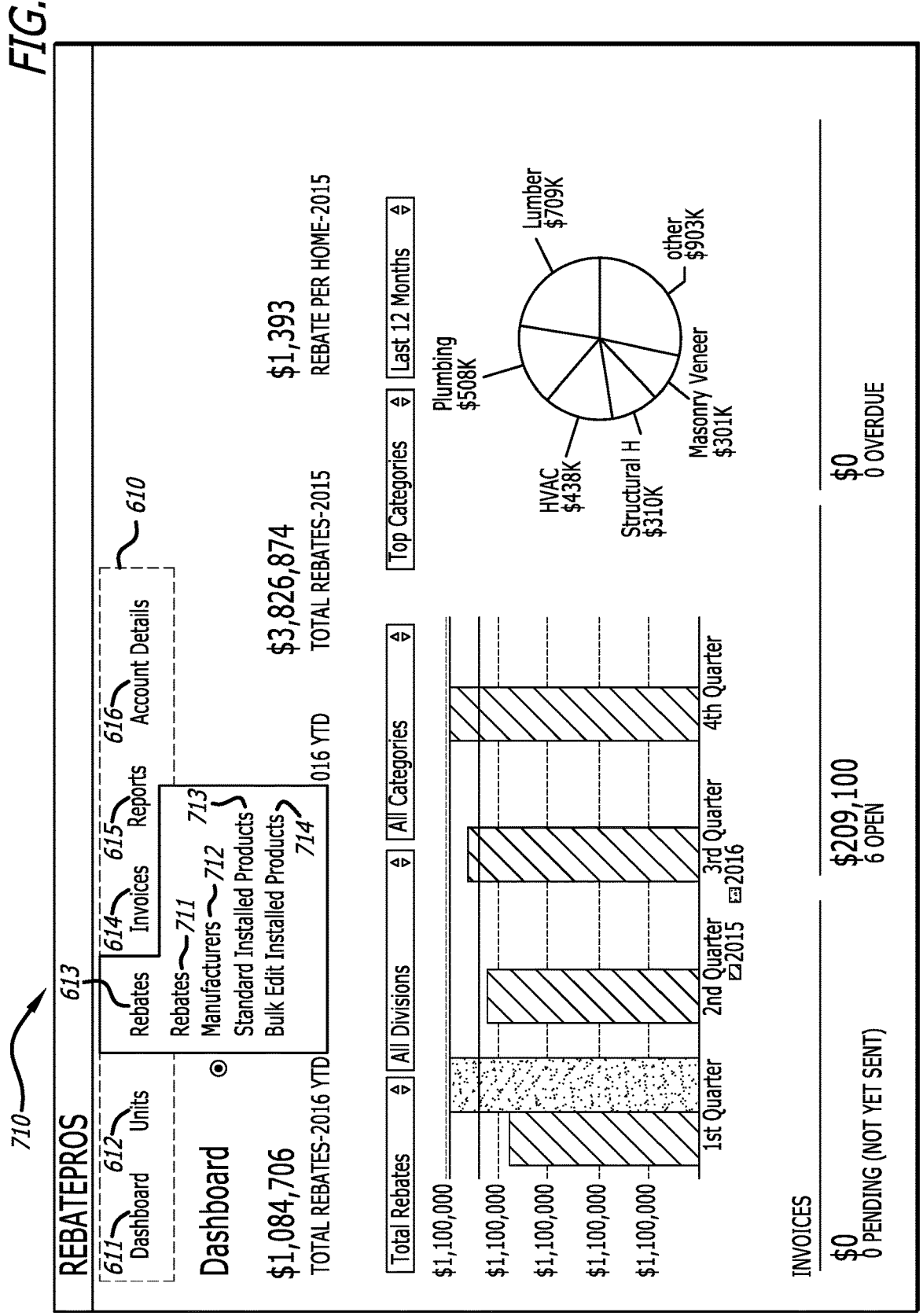
FIG. 7B is exemplary embodiment of a third user interface display screen 710 produced by the dashboard generation logic of FIGS. 1 and 4 that provides an interactive dashboard.
Figure 11:
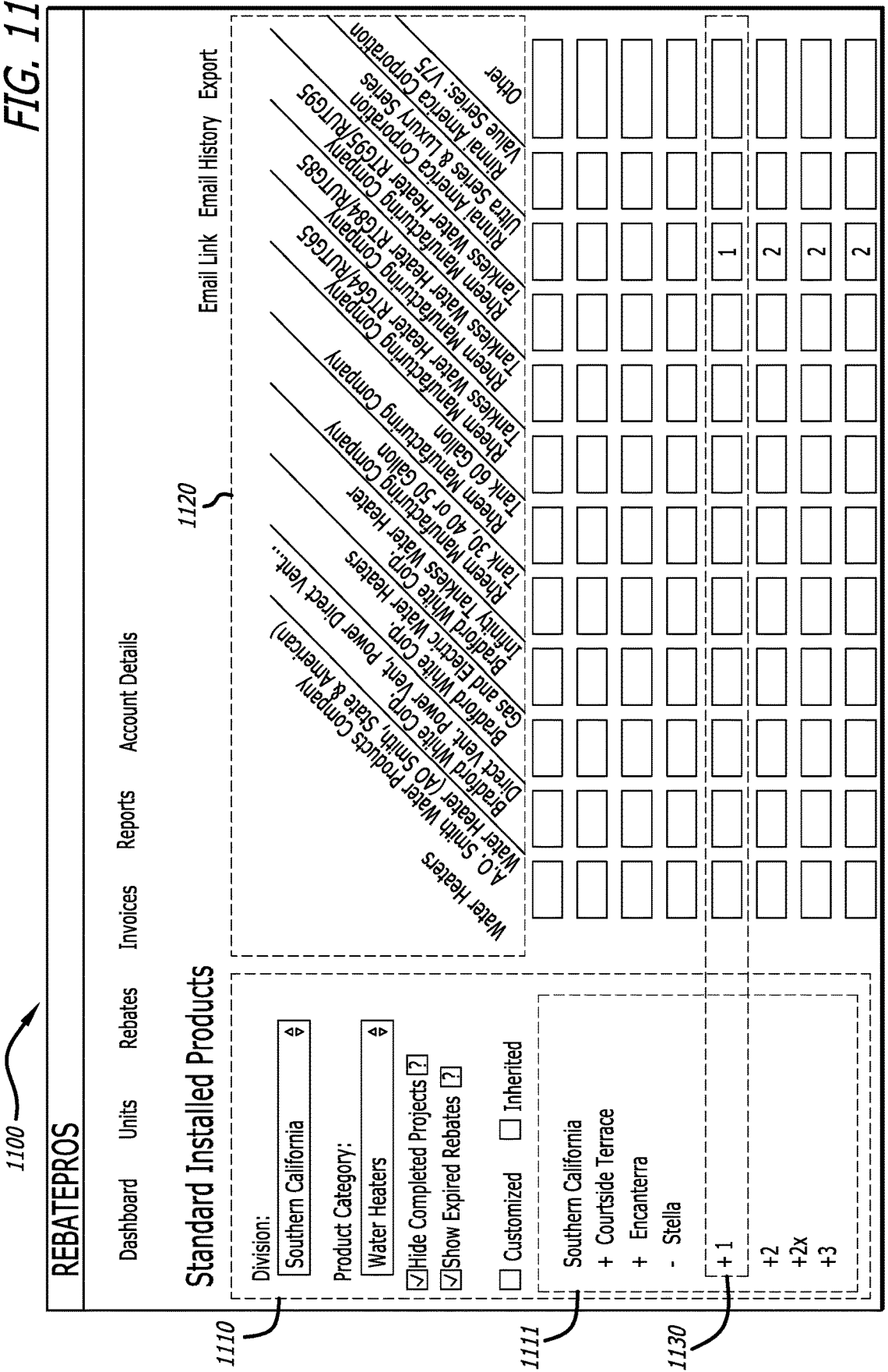
FIG. 11 is an exemplary embodiment of a eighth user interface display screen 1100 produced by the dashboard generation logic of FIGS. 1 and 4 that provides an interactive dashboard.

Referring to FIG. 7B, an exemplary embodiment of a third user interface display screen 710 produced by the dashboard generation logic of FIGS. 1 and 4 that provides an interactive dashboard is shown. Herein, rendered by the dashboard generation logic, the display screen 710 comprises a plurality of display areas as discussed above and specifically display area 610 which illustrates option Rebates 613 selected and presents a further drop-down menu including additional options for filtering the information displayed by the dashboard display screen. The drop-down menu options include, but are not limited or restricted to, Rebates 711, Manufacturers 712, Standard Installed Products 713 and Bulk Edit Installed Products 714. The additional filtering options presented when the option Rebates 613 is selected filter the information displayed on the dashboard as follows: (i) when Rebates 711 is selected, display a rebate review/edit display screen (as seen in FIGS. 8 and 11), (ii) when Manufacturers 712 is selected, display a Manufacturer review/edit display screen (as seen in FIG. 12), (iii) when Standard Installed Products 713 is selected, display a Standard Installed Products review/edit display screen (as seen in FIGS. 10-11), and (iv) when Bulk Edit Installed Products 714 is selected, display a bulk edit review/edit display screen.

Additionally, although not illustrated, the options Reports 615 and Account Details 616 also include additional options for filtering the information displayed by the dashboard display screen. Additional options presented when the option Reports 615 is selected include, but are not limited to, Division Rebates, Project Rebates and Gaps & Analytics. Additional options presented when the option Account Details 616 is selected, include but are not limited to, My Account, Company Profile, Company Settings, Users and Billing.

Figure 7C:
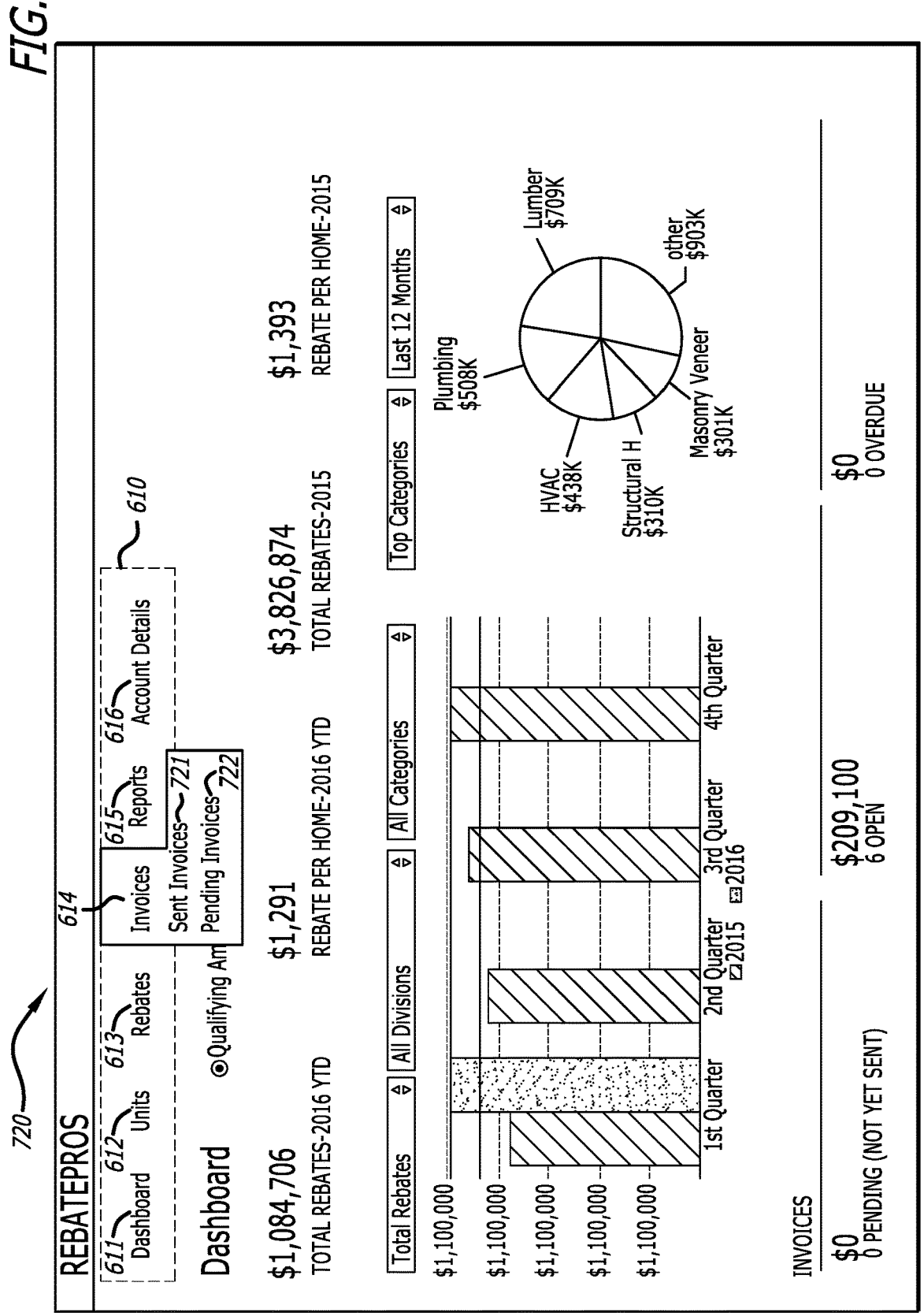
FIG. 7C is an exemplary embodiment of a fourth user interface display screen 720 produced by the dashboard generation logic of FIGS. 1 and 4 that provides an interactive dashboard.

Referring to FIG. 7C, an exemplary embodiment of a fourth user interface display screen 720 produced by the dashboard generation logic of FIGS. 1 and 4 that provides an interactive dashboard is shown. Herein, rendered by the dashboard generation logic, the display screen 720 comprises a plurality of display areas as discussed above and specifically display area 610, which illustrates option Invoices 614 is selected and presents a further drop-down menu including additional options for filtering the information displayed by the dashboard display screen. The drop-down menu options include, but are not limited or restricted to, Sent Invoices 721 and Pending Invoices 722. The additional filtering options presented when the option Invoices 614 is selected filter the information displayed on the dashboard as follows: (i) when Sent Invoices 721 is selected, display one or more sent invoices (as seen in FIG. 13), and (ii) Pending Invoices 722 is selected, display one or more pending invoices.

Referring now to FIG. 8, an exemplary embodiment of a fifth user interface display screen 800 produced by the dashboard generation logic of FIGS. 1 and 4 that provides an interactive dashboard is shown. Herein, rendered by the dashboard generation logic, the display screen 800 comprises a plurality of display areas 801, 802 and 803 that illustrates information directed to adding a rebate for storage by the rebate determination system and use in subsequent rebate determination processes. More specifically, display area 801 includes one or more data entry methods for entering in manufacturer information. In one embodiment, at least a portion of the information may be automatically populated as a result of selecting a known manufacturer from a drop-down menu. Display area 802 includes specifics regarding the rebate including, but not limited or restricted to, the rebate type (e.g., cash back, money to spend on products from that manufacturer), a time frame of the rebate (e.g., a billing cycle), a start date for the rebate, payment terms for the rebate when a developer is eligible, proof of eligibility requirements, etc. Display area 803 includes additional information associated with the rebate including general notes, a price protection, special discounts for model homes, etc. It has been contemplated that additional and/or alternative information corresponding to a rebate and/or manufacturer may be displayed on display screen 800; thus, the disclosure should not be limited to the information illustrated in FIG. 8.

Figure 9:
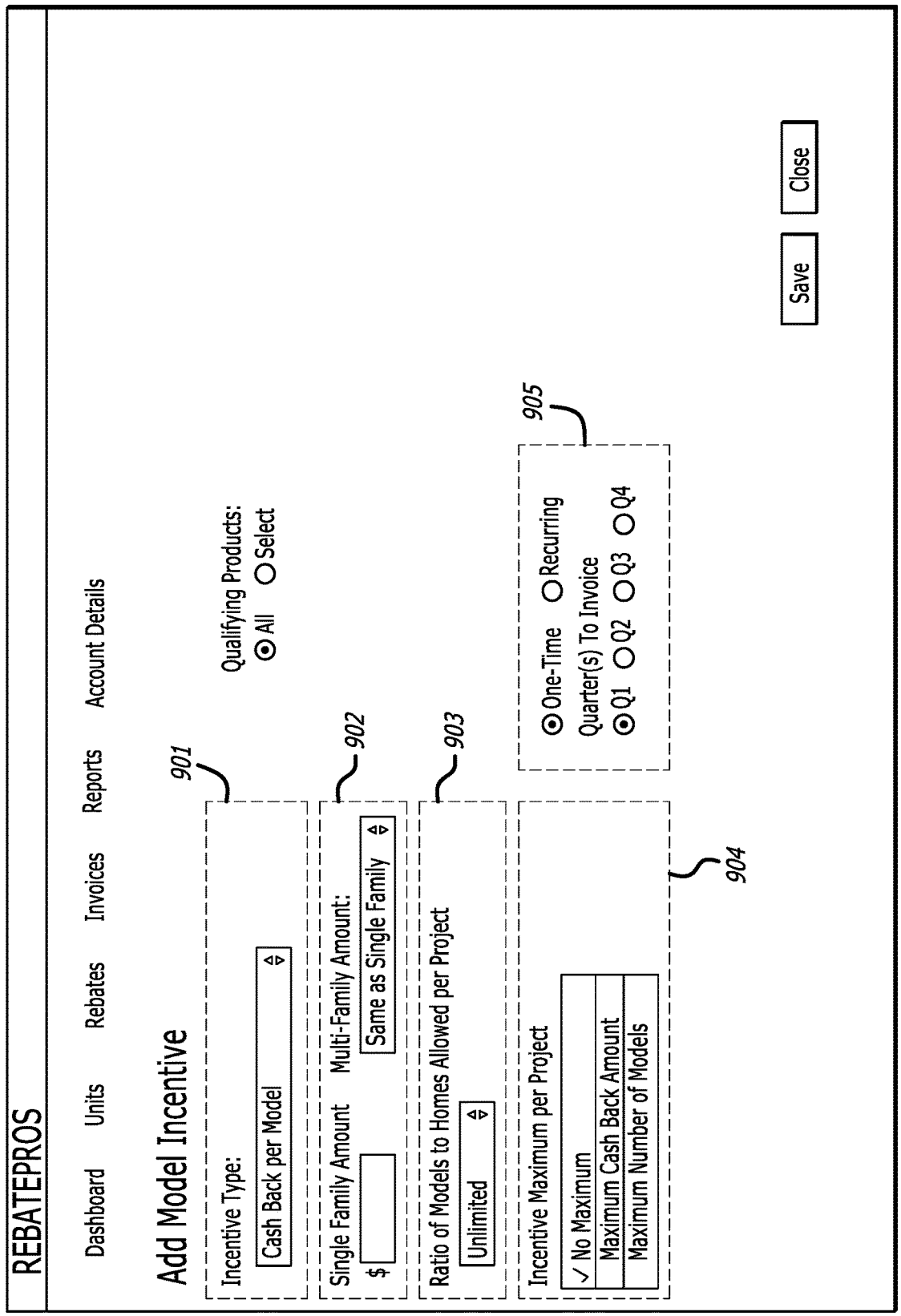
FIG. 9 is an exemplary embodiment of a sixth user interface display screen 900 produced by the dashboard generation logic of FIGS. 1 and 4 that provides an interactive dashboard.

Referring to FIG. 9, an exemplary embodiment of a sixth user interface display screen 900 produced by the dashboard generation logic of FIGS. 1 and 4 that provides an interactive dashboard is shown. Herein, rendered by the dashboard generation logic, the display screen 900 comprises a plurality of display areas 901, 902, 903, 904 and 905 that illustrates information directed to adding an incentive for storage by the rebate determination system and use in subsequent rebate determination processes. More specifically, display area 901 includes a data entry method (e.g., herein a drop-down menu) for entering an incentive type (e.g., cash back). Display area 902 includes one or more data entry methods corresponding to the monetary amount received for the rebate (e.g., per single family unit, an per multi-family unit). Display areas 903, 904 and 905 provide additional data entry methods for selecting additional restrictions regarding requirements obtaining eligibility for the incentive. It has been contemplated that additional and/or alternative information corresponding to an incentive may be displayed on display screen 900; thus, the disclosure should not be limited to the information illustrated in FIG. 9.

Referring to FIG. 10, an exemplary embodiment of a seventh user interface display screen 1000 produced by the dashboard generation logic of FIGS. 1 and 4 that provides an interactive dashboard is shown. Herein, rendered by the dashboard generation logic, the display screen 1000 comprises a plurality of display areas 1001 and 1002 that illustrates information directed to adding a product to a database of stored products that may be utilized in either the generation of the standard installed products layer and/or the generation of a customized layer, as discussed above. Specifically, display area 1001 includes, inter alia, data entry methods, text boxes and/or drop-down menus for entering specifics about a new product. For example, as shown, display area 1001 may include a text box for entering a product name, and drop-down menus for entering: a category of the product, a sub-category of the product, and a product group. The display area 1002 includes, inter alia, data entry methods, text boxes and/or drop-down menus for entering specifics about an incentive corresponding to the new product. For example, one of a plurality of incentive types may be selected from a drop-down menu including, but not limited or restricted to: per home (e.g., unit), per each product, per each product tiered, per linear foot of each unit, per square foot of each unit, per linear foot each unit tiered, per square foot of each unit tiered, per unit square foot, per unit square foot tiered, per unit square foot multiplied by per each product, per unit square foot multiplied by per each product tiered, per unit tiered (e.g., nationally), per each product tiered (e.g., nationally), etc. As used herein, the term "tiered" may be refer to the incentive having a plurality of groupings such that a first, lowest grouping (e.g., 1-100 units) results in qualification for a first incentive and a second, higher grouping (e.g., 101-200 units) results in qualification for a second incentive, wherein the second incentive is greater than the first incentive. Additionally, display area 1002 includes (i) textboxes to enter a monetary amount for the rebate, a starting and ending quantity of the product required for the rebate, specific unit types to which the rebate is available, a specific division and (ii) a dropdown menu to select an exclusivity of the rebate, which determines whether the eligibility of the rebate is limited.

Referring to FIG. 11, an exemplary embodiment of a eighth user interface display screen 1100 produced by the dashboard generation logic of FIGS. 1 and 4 that provides an interactive dashboard is shown. Herein, rendered by the dashboard generation logic, the display screen 1100 comprises a plurality of display areas 1110, 1111, 11120 and 1121 that illustrates information directed to an exemplary standard installed products layer displayed in one type of a generalized data structure (e.g., herein, a table). Alternative, examples of types of data structures may include, but are not limited or restricted to, an array, a file, a record, a tree, etc. More specifically, display area 1110 provides a sample illustration filtering options for floor plans set forth in display area 1111 and/or filtering options for products set forth in display area 1120. For example, the filtering options may include, inter alia, a division, a region, a project, floor plan, product category, etc. The display area 1111 illustrates the floor plans corresponding to the selected filters as illustrated in the display area 1110. In the embodiment of FIG. 11, each floor plans comprises a label for a corresponding row in the table of display area 1121. Referring again to the display area 1110, the floor plans displayed are restricted by a division filter of "Southern California." Thus, the floor plans seen in display area 1111 comprise at least a portion of the floor plans of units located in Southern California. The display area 1120 illustrates the products corresponding to the selected filters as illustrated in the display area 1110. In the embodiment of FIG. 11, each product comprises a label for a corresponding column in the table of display area 1121. Referring again to the display area 1110, the products displayed are restricted by a product category filter of "Water Heaters." Thus, the products seen in display area 1120 comprise at least a portion of the products within the category of water heaters. As an illustrative example, row 1130 represents the default one or more water heaters installed in a first elevation of the floor plan "Stella." As is seen, the first elevation of "Stella" includes one "Rinnai America Corporation: Ultra Series & Luxury Series" water heater.

Referring to FIG. 12, an exemplary embodiment of a ninth user interface display screen 1200 produced by the dashboard generation logic of FIGS. 1 and 4 that provides an interactive dashboard is shown. Herein, rendered by the dashboard generation logic, the display screen 1200 comprises a plurality of display areas 1210 and 1220 that illustrates information directed to a listing of Units and associated data. The associated data may include, but is not limited or restricted to: a Lot number (e.g., in a particular project), an address, a project name, the square footage of the unit, whether the unit is a model (e.g., standard/default or customized), the date on which the unit was completed and a sum of the rebates attributed to the unit. As one example, row 1221 corresponds to a unit at lot 10 having an address of "10 Sample Street," wherein the unit is part of the project "Courtside Terrace." Additionally, row 1221 displays the square footage of the unit as being 1834, that the unit was completed on Mar. 31, 2015 and that the rebates attributable to the unit total $902.00. It has been contemplated that additional and/or alternative information corresponding to a unit may be displayed within a row; thus, the disclosure should not be limited to the information illustrated in FIG. 12.

Referring to FIG. 13, an exemplary embodiment of a tenth user interface display screen 1300 produced by the dashboard generation logic of FIGS. 1 and 4 that provides an interactive dashboard is shown. Herein, rendered by the dashboard generation logic, the display screen 1300 comprises a plurality of display areas 1310 and 1320 that illustrates information directed to a listing of sent invoices and associated data. Display area 1310 provides a plurality of filtering options that, when selected, filter the listing of sent invoices by, for example, manufacturer, year, quarter, status, invoice number, etc. The associated displayed in displayed area 1320 may include, but is not limited or restricted to: an invoice number, a manufacturer, a type of rebate, the date on which the invoice was sent, a period during which the invoice was sent, the status of the invoice, the total of the invoice, etc. As one example, row 1321 corresponds to an invoice having an invoice number of "2855" and corresponding to manufacturer, "Delta Faucet." Additionally, row 1221 displays the type of rebate associated with the invoice as being "Cash Back," that the invoice was sent on Jun. 1, 2016 during the first quarter of that same year, that the invoice has been paid and that the total sum of the invoice is $131,600.00. It has been contemplated that additional and/or alternative information corresponding to a unit may be displayed within a row; thus, the disclosure should not be limited to the information illustrated in FIG. 13.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A method comprising:

causing a rendering of a first graphical user interface on a display of a first client device, the first graphical user interface is configured to display a first plurality of input fields and to receive first user input, wherein the first plurality of input fields corresponds to administrative rebate information including (i) manufacturer information and (ii) payment parameters associated with a rebate including a rebate type, a predetermined time frame for the rebate, and payment terms for the rebate;

detecting a selection of a manufacturer by a user using a first graphical user interface control element being part of the first graphical user interface;

in response to detecting selection of the manufacturer, automatically entering, into portions of the first plurality of input fields, administrative rebate information corresponding to the manufacturer;

causing a rendering of a second graphical user interface configured to display a second plurality of input fields, wherein the second plurality of input fields corresponds to rebate incentive information including (i) parameters of a product name or model, (ii) an availability parameter specifying a type of unit to which the rebate is available and (iii) an exclusivity parameter of the rebate associated with a prescribed region, wherein a combination of one or more parameters of the rebate incentive information corresponds to a set of rebate criteria associated with the rebate;

detecting a selection of the prescribed region associated with the exclusivity parameter by the user using a second graphical user interface control element being part of the second graphical user interface;

in response to the selection of the prescribed region, dynamically updating the second graphical user interface with the exclusivity parameter of the rebate associated with the prescribed region;

receiving, via the first graphical user interface and the second graphical user interface, user input to the first plurality of input fields and the second plurality of input fields, including the manufacturer and the selected prescribed region associated with the exclusivity parameter, that defines the rebate as comprising (i) a first discount to be received in response to satisfying a first set of rebate criteria and (ii) a second discount to be received in response to satisfying a second set of rebate criteria, wherein the first set of rebate criteria requires installation of one or more products supplied by the manufacturer and the second set of rebate criteria requires installation of the one or more products supplied by the manufacturer that satisfies a specified level of use within the prescribed region identified by the exclusivity parameter over the predetermined time frame, the second discount being a greater amount than the first discount;

storing the rebate on non-transitory computer-readable medium of a network device;

receiving information associated with the one or more products installed within a plurality of residential or commercial units including a region of installation for the one or more products;

automatically determining whether the second set of rebate criteria of the rebate is satisfied for any of the plurality of residential or commercial units based on at least the received information associated with one or more products including the region of installation that is within the prescribed region associated with the exclusivity parameter;

responsive to determining that the second set of rebate criteria of the rebate has not been satisfied by the plurality of residential or commercial units, automatically determining whether the first set of rebate criteria of the rebate is satisfied for a remainder of the plurality of residential or commercial units; and responsive to the received information associated with one or more products and determined satisfaction of at least one set of rebate criteria, (i) triggering automatic generation of a first invoice including the rebate owed by the manufacturer based on compliance with the second set of rebate criteria or the first set of rebate criteria, (ii) triggering automatic transmission, over a network, of the first invoice to the manufacturer identified by the manufacturer information corresponding to the rebate selected and entered by the user in the first graphic user interface, and (iii) triggering automatic transmission of a notification to a developer that indicates satisfaction of either the first set of rebate criteria or the second set of rebate criteria.

2. The method of claim 1, further comprising:
generating a sum graphical user interface configured to display one or more of: (i) a sum of total rebates for a first predetermined time period, or (ii) a sum of total rebates per unit for the first predetermined time period.

3. The method of claim 2, wherein the sum graphical user interface is configured to display a second diagram illustrating total rebates divided into portions of sums of rebates for one or more product categories.

4. The method of claim 1, wherein the first discount being a first amount of payment to be returned in response to satisfying the first set of rebate criteria and the second discount being a second amount of payment to be returned in response to satisfying the second set of rebate criteria, the first amount of payment being less than the second amount of payment.

5. The method of claim 1, wherein the prescribed region associated with the second discount is larger than a requisite area associated with the first discount thereby corresponding to a greater level of exclusivity in the installation of the one or more products.

6. The method of claim 1 further comprising:
transmitting one or more notifications to the manufacturer identifying the rebate owed to the developer.

7. The method of claim 6 wherein the one or more notifications graphically illustrates each invoice sent by the developer and data associated with each invoice, the data includes a sum of the rebate currently payable by the manufacturer for a particular residential or commercial unit of the plurality of residential or commercial units.

8. The method of claim 1, further comprising:
receiving information of a project plan, wherein the project plan includes the plurality of residential or commercial units to which the rebate applies, wherein the project plan further comprises a listing of all floor plans in the project plan.

9. The method of claim 8, wherein the receiving of the information associated with the one or more products installed within the plurality of residential or commercial units comprises receiving a selection of standard installed products for each floor plan in the project plan.

10. The method of claim 1, wherein the level of use includes a level of exclusivity in the installation of the one or more products over the prescribed region.

11. The method of claim 1, wherein the level of use is one of a plurality of tiers of use, wherein a first tier indicates a first quantity of the one or more products over the prescribed region, and a second tier indicates a second quantity of the one or more products over the prescribed region, the second quantity being greater than the first quantity.

12. The method of claim 1, wherein the exclusivity parameter indicates that the rebate applies exclusively to the prescribed region being one of a national territory, a regional territory, a divisional territory or a specific project.

13. The method of claim 1, wherein the administrative rebate information further includes at least one of a billing cycle, a start date, or a submission requirement.

14. The method of claim 1, wherein the prescribed exclusivity parameter pertains to a specified geographic region selected from a plurality of geographic region sizes including a prescribed area with a state where the prescribed area includes a plurality of cities.

15. The method of claim 1 further comprising:
causing rendering of a third graphical user interface configured to display a first listing of a plurality of sent invoices including the first invoice;
receiving, via the third graphical user interface, user input through an interactive selection element corresponding to a filtering parameter;
determining a filtered listing of the plurality of sent invoices in accordance with the filtering parameter, wherein the filtered listing differs from the first listing; and
automatically modifying the third graphical user interface to display the filtered listing of the plurality of sent invoices.

16. The method of claim 15, wherein the second graphical user interface is configured to receive user input enabling filtering of one or more of the plurality of sent invoices by one or more of a corresponding manufacturer, a year, a quarter, a status or an invoice number.

17. The method of claim 1, wherein the first graphical user interface control element comprises a drop-down menu.

18. The method of claim 17, wherein the second graphical user interface control element comprises a drop-down menu.

19. A system comprising:
one or more hardware processors; and
a non-transitory storage medium communicatively coupled to the one or more hardware processors, the non-transitory storage medium having stored thereon logic that, when executed by the one or more hardware processors, causes operations comprising:
causing a rendering of a first graphical user interface configured to display a first plurality of input fields and to receive first user input, wherein the first plurality of input fields corresponds to administrative rebate information including (i) manufacturer information and (ii) payment parameters associated with a rebate including a rebate type, a predetermined time frame for the rebate, and payment terms for the rebate,
detecting a selection of a manufacturer by a user using a first graphical user interface control element being part of the first graphical user interface,
in response to detecting selection of the manufacturer, automatically entering into portions of the first plurality of input fields administrative rebate information corresponding to the manufacturer,
causing a rendering of a second graphic user interface configured to display a second plurality of input fields, wherein the second plurality of input fields corresponds to rebate incentive information including (i) parameters of a product name or model, (ii) an availability parameter specifying a type of unit to which the rebate is available and (iii) an exclusivity parameter of the rebate associated with a prescribed region, wherein a combination of one or more parameters of the rebate incentive information corresponds to a set of rebate criteria associated with the rebate,
detecting a selection of the prescribed region associated with the exclusivity parameter by the user using a second graphical user interface control element being part of the second graphical user interface,
in response to the selection of the prescribed region, dynamically updating the second graphical user interface with the selected exclusivity parameter of the rebate associated with the prescribed region,
receiving, via the first graphical user interface and the second graphical user interface, user input to the first plurality of input fields and the second plurality of input fields, including the manufacturer and the selected prescribed region associated with the exclusivity parameter, that defines the rebate as comprising (i) a first discount to be received in response to satisfying a first set of rebate criteria and (ii) a second discount to be received in response to satisfying a second set of rebate criteria, wherein the first set of rebate criteria requires installation of one or more products supplied by the manufacturer and the second set of rebate criteria requires installation of the one or more products supplied by the manufacturer that satisfies a specified level of use within the prescribed region identified by the exclusivity parameter over the predetermined time frame, the second discount being a greater amount than the first discount,
storing the rebate on non-transitory computer-readable medium of a network device,
receiving information associated with the one or more products installed within a plurality of residential or commercial units including a region of installation for the one or more products,
automatically determining whether the second set of rebate criteria of the rebate is satisfied for any of the plurality of residential or commercial units based on at least the received information associated with one or more products-including the region of installation that is within the prescribed region associated with the exclusivity parameter,
responsive to determining that the second set of rebate criteria of the rebate has not been satisfied by the plurality of residential or commercial units, automatically determining whether the first set of rebate criteria of the rebate is satisfied for a remainder of the plurality of residential or commercial units, and
responsive to the received information associated with one or more products and determined satisfaction of at least one set of rebate criteria, (i) triggering automatic generation of a first invoice including the rebate owed by the manufacturer based on compliance with the second set of rebate criteria or the first set of rebate criteria, (ii) triggering automatic transmission, over a network, of the first invoice to the manufacturer identified by the manufacturer information corresponding to the rebate selected and entered by the user in the first graphic user interface, and (iii) triggering automatic transmission of a notification to a developer that indicates satisfaction of either the first set of rebate criteria or the second set of rebate criteria.

20. The system of claim 19, wherein the first discount being a first amount of payment to be returned in response to satisfying the first set of rebate criteria and the second discount being a second amount of payment to be returned in response to satisfying the second set of rebate criteria, the first amount of payment being less than the second amount of payment.

21. The system of claim 19, wherein the prescribed region associated with the second discount is larger than a requisite area associated with the first discount thereby corresponding to a greater level of exclusivity in the installation of the one or more products.

22. The system of claim 19, wherein the non-transitory storage medium having stored thereon the logic that, when executed by the one or more hardware processors, causes further operations comprising:
transmitting one or more notifications to the manufacturer identifying the first rebate owed to the developer of the project plan.

23. The system of claim 22, wherein the non-transitory storage medium having stored thereon the logic that, when executed by the one or more hardware processors, causes further operations comprising:
generating a graphical display to illustrate each invoice sent by the developer and data associated with each invoice, the data includes a sum of the rebate currently payable by the manufacturer for a particular residential or commercial unit of the plurality of residential or commercial units.

24. The system of claim 19, wherein the exclusivity parameter indicates that the rebate applies exclusively to one of a national territory, a regional territory, a divisional territory or a specific project.

25. The system of claim 19, wherein the administrative rebate information further includes at least one of a billing cycle, a start date, or a submission requirement.

26. The system of claim 19, wherein the prescribed exclusivity parameter pertains to a specified geographic region selected from a plurality of geographic region sizes including a prescribed area with a state where the prescribed area includes a plurality of cities.

27. The system of claim 19, wherein the first graphical user interface control element comprises a drop-down menu.

28. The system of claim 27, wherein the second graphical user interface control element comprises a drop-down menu.

* * * * *